United States Patent
Natarajan et al.

(10) Patent No.: US 11,704,245 B2
(45) Date of Patent: Jul. 18, 2023

(54) DYNAMIC ALLOCATION OF CACHE MEMORY AS RAM

(71) Applicant: Apple Inc., Cupertino, CA (US)

(72) Inventors: Rohit Natarajan, Sunnyvale, CA (US); Jurgen M. Schulz, Pleasanton, CA (US); Christopher D. Shuler, Davis, CA (US); Rohit K. Gupta, Santa Clara, CA (US); Thomas T. Zou, Millbrae, CA (US); Srinivasa Rangan Sridharan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/462,777

(22) Filed: Aug. 31, 2021

(65) Prior Publication Data
US 2023/0067307 A1  Mar. 2, 2023

(51) Int. Cl.
G06F 12/00 (2006.01)
G06F 12/0802 (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS

| | | |
|---|---|---|
| 4,953,079 A | 8/1990 | Ward et al. |
| 5,307,477 A | 4/1994 | Taylor et al. |
| 5,502,833 A | 3/1996 | Bym et al. |
| 5,603,002 A | 2/1997 | Hashimoto |
| 5,913,224 A | 6/1999 | MacDonald |
| 6,370,619 B1 | 4/2002 | Ho et al. |
| 6,438,651 B1 | 8/2002 | Slane |
| 7,310,706 B1 | 12/2007 | Stribaek et al. |
| 7,987,407 B2 | 7/2011 | Gille et al. |
| 8,760,460 B1 | 6/2014 | Kilgariff et al. |
| 2003/0172232 A1 | 9/2003 | Naffziger |
| 2004/0098575 A1 | 5/2004 | Datta et al. |
| 2005/0071572 A1 | 3/2005 | Nakashima et al. |
| 2008/0162816 A1 | 7/2008 | Buxton et al. |
| 2008/0168112 A1* | 7/2008 | Lyons ............... G06F 12/023 |
| 2008/0168230 A1 | 7/2008 | Shen et al. |

(Continued)

OTHER PUBLICATIONS

Office Action in U.S. Appl. No. 17/462,812 dated Sep. 19, 2022, 17 pages.

(Continued)

*Primary Examiner* — Gurtej Bansal
(74) *Attorney, Agent, or Firm* — Kowert, Hood, Munyon, Rankin & Goetzel, P.C.; Scott W. Pape; Dean M. Munyon

(57) ABSTRACT

An apparatus includes a cache controller circuit and a cache memory circuit that further includes cache memory having a plurality of cache lines. The cache controller circuit may be configured to receive a request to reallocate a portion of the cache memory circuit that is currently in use. This request may identify an address region corresponding to one or more of the cache lines. The cache controller circuit may be further configured, in response to the request, to convert the one or more cache lines to directly-addressable, random-access memory (RAM) by excluding the one or more cache lines from cache operations.

20 Claims, 17 Drawing Sheets

(56) References Cited

U.S. PATENT DOCUMENTS

| | | | |
|---|---|---|---|
| 2009/0217058 A1* | 8/2009 | Obereiner | G06F 21/79 |
| | | | 713/193 |
| 2012/0159082 A1 | 6/2012 | Cox et al. | |
| 2012/0254548 A1* | 10/2012 | Comparan | G06F 12/0815 |
| | | | 711/135 |
| 2015/0046657 A1 | 2/2015 | Guthmuller et al. | |
| 2015/0269083 A1 | 9/2015 | Koker et al. | |
| 2017/0017408 A1 | 1/2017 | Byun | |
| 2017/0091105 A1 | 3/2017 | Cain, III et al. | |
| 2018/0173627 A1 | 6/2018 | Hsu et al. | |
| 2018/0337887 A1* | 11/2018 | Aluvala | H04L 47/2433 |
| 2020/0218471 A1 | 7/2020 | Chen et al. | |
| 2020/0278797 A1 | 9/2020 | Bavishi | |
| 2021/0042228 A1 | 2/2021 | Herdrich et al. | |
| 2022/0058132 A1* | 2/2022 | Roberts | G06F 12/0895 |
| 2022/0197814 A1 | 6/2022 | Yudanov | |

OTHER PUBLICATIONS

Office Action in U.S. Appl. No. 17/462,812 dated Sep. 19, 2022, 18 pages.
International Search Report and Written Opinion in PCT Appl. No. PCT/US2022/038644 dated Nov. 16, 2022, 9 pages.

* cited by examiner

*700*

```
Receiving, by a cache controller circuit, a request to reallocate a portion
of a cache memory circuit, that is currently in use, to a directly-
addressable address region, wherein the request identifies a currently
inactive address region.
710
```
↓
```
Based on the identified address region, selecting one or more cache
lines of the cache memory circuit to convert.
720
```
↓
```
Setting, by the cache controller circuit, a respective indication for ones of
the selected cache lines to exclude the selected cache lines from further
cache operations.
730
```

```
┌─────────────────────────────────────────────────────┐
│ Receiving, by a cache controller circuit from an    │
│ unauthorized agent, a memory transaction for the    │
│ identified address region.                          │
│ 810                                                 │
└─────────────────────────────────────────────────────┘
                          │
                          ▼
┌─────────────────────────────────────────────────────┐
│ In response to determining that the identified      │
│ address region is part of a secure access region,   │
│ ignoring, by the cache controller circuit, the      │
│ memory transaction from the unauthorized agent.     │
│ 820                                                 │
└─────────────────────────────────────────────────────┘
                          │
                          ▼
┌─────────────────────────────────────────────────────┐
│ Receiving, by the cache controller circuit, a       │
│ different request to deallocate the portion of the  │
│ cache memory circuit from the directly-             │
│ addressable address region.                         │
│ 830                                                 │
└─────────────────────────────────────────────────────┘
                          │
                          ▼
┌─────────────────────────────────────────────────────┐
│ In response to the different request, including the │
│ one or more cache lines in cache operations,        │
│ wherein data stored in the directly-addressable     │
│ address region during the reallocation is           │
│ overwritten without a write-back to a system        │
│ memory circuit.                                     │
│ 840                                                 │
└─────────────────────────────────────────────────────┘
                          │
                          ▼
┌─────────────────────────────────────────────────────┐
│ Returning a default value by the cache controller   │
│ circuit in response to a read request for an        │
│ address in the directly-addressable address region  │
│ received after the deallocating,.                   │
│ 850                                                 │
└─────────────────────────────────────────────────────┘
                          │
                          ▼
┌─────────────────────────────────────────────────────┐
│ Generating, by the cache controller circuit in      │
│ response to a write request to an address in the    │
│ directly-addressable address region received after  │
│ the deallocating, an error.                         │
│ 860                                                 │
└─────────────────────────────────────────────────────┘
```

*FIG. 8*

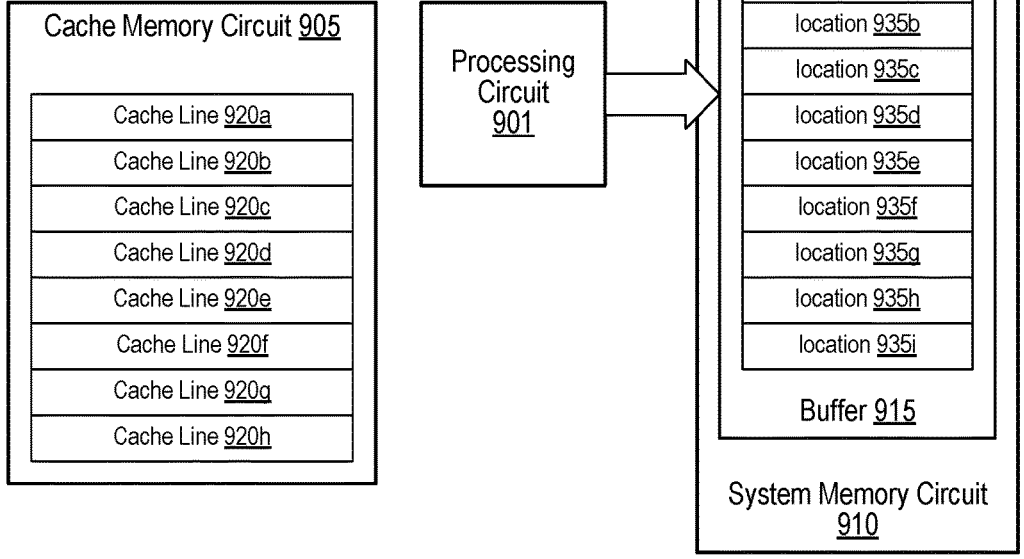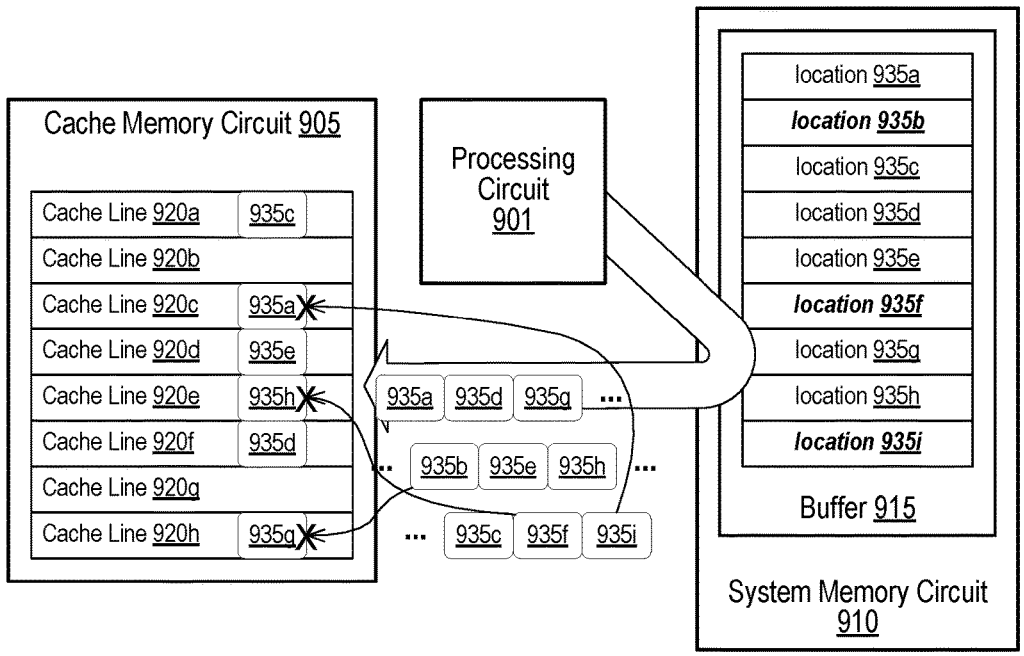
FIG. 9

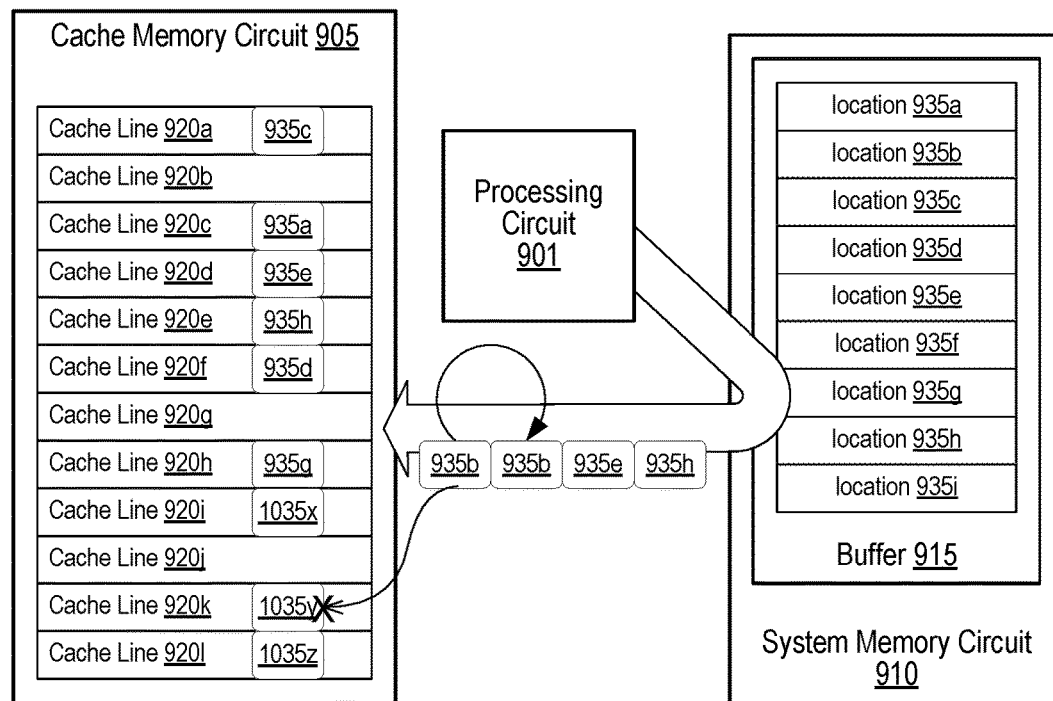
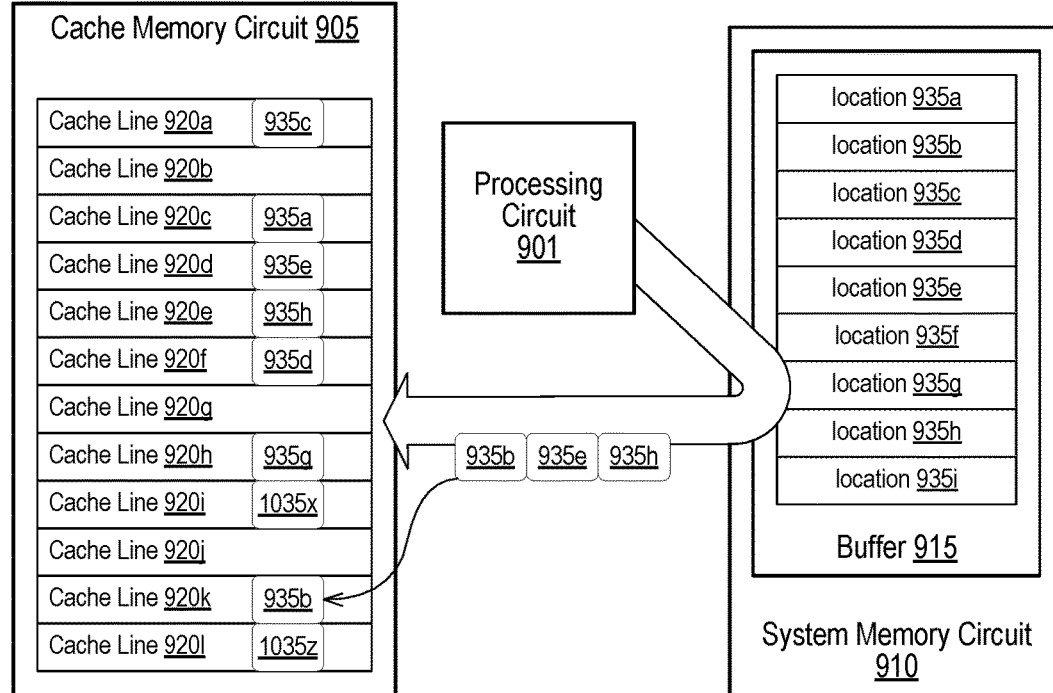
FIG. 10

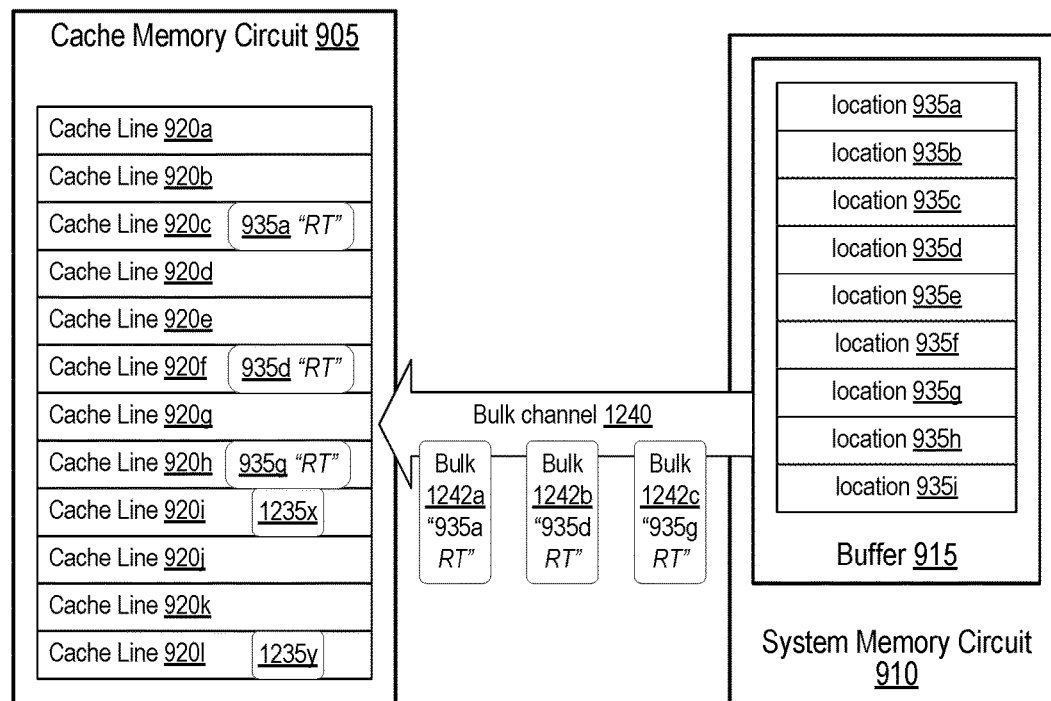
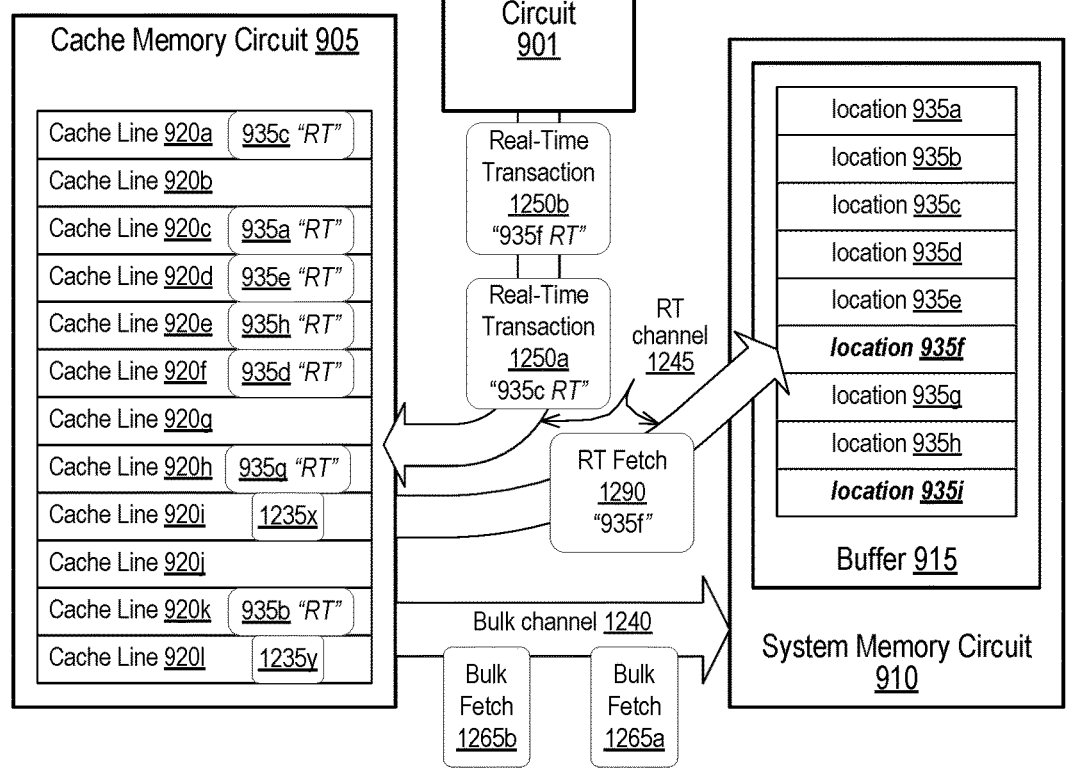
FIG. 12

*1300*

```
┌─────────────────────────────────────────────────────┐
│ Allocating, by a processing circuit, a plurality of │
│ locations in a system memory to a buffer.           │
│ 1310                                                │
└─────────────────────────────────────────────────────┘
                          │
                          ▼
┌─────────────────────────────────────────────────────┐
│ Determining, by the processing circuit, a particular│
│ order for allocating the plurality of locations into│
│ a cache memory, the particular order increasing a   │
│ uniformity of cache miss rates in comparison to a   │
│ linear order.                                       │
│ 1320                                                │
└─────────────────────────────────────────────────────┘
                          │
                          ▼
┌─────────────────────────────────────────────────────┐
│ Caching, by the processing circuit, the plurality of│
│ locations of the buffer using the particular order. │
│ 1330                                                │
└─────────────────────────────────────────────────────┘
```

```
┌─────────────────────────────────────────────────────────┐
│ Determining the particular order using a desired cache  │
│           miss rate for the plurality of locations.      │
│                          1510                            │
└─────────────────────────────────────────────────────────┘
                            │
                            ▼
┌─────────────────────────────────────────────────────────┐
│ Accessing, by the processing circuit after the caching, │
│      the plurality of locations using a linear order.    │
│                          1520                            │
└─────────────────────────────────────────────────────────┘
                            │
                            ▼
┌─────────────────────────────────────────────────────────┐
│ Tracking a cache miss rate associated with the use of   │
│     the particular order to cache the plurality of       │
│                       locations.                         │
│                          1530                            │
└─────────────────────────────────────────────────────────┘
                            │
                            ▼
┌─────────────────────────────────────────────────────────┐
│ In response to determining that the tracked cache miss  │
│   rate satisfies a threshold rate, adjusting the         │
│         particular order for a subsequent use.           │
│                          1540                            │
└─────────────────────────────────────────────────────────┘
```

*FIG. 15*

DYNAMIC ALLOCATION OF CACHE MEMORY AS RAM

BACKGROUND

Technical Field

Embodiments described herein are related to systems-on-a-chip (SoCs) and, more particularly, to methods for operating a cache memory.

Description of the Related Art

System-on-a-chip (SoC) integrated circuits (ICs) generally include one or more processors that serve as central processing units (CPUs) for a system, along with various other components such as memory controllers and other agents. As used herein, an "agent" refers to a functional circuit that is capable of initiating or being a destination for a transaction via a bus circuit. Accordingly, general-purpose processors, graphics processors, network interfaces, memory controllers, and other similar circuits may be referred to as agents. As used herein, a "transaction" refers to a data exchange between two agents across one or more bus circuits. Transactions from an agent to read data from, or store data to, a memory circuit are a typical type of transaction, and may include large amounts of data. Memory circuits may use multiple clock cycles to access data within its memory cells.

Cache memories are frequently used in SoCs to support increased performance of processors by reducing delays associated with transactions to system memories and/or non-volatile storage memories. Cache memories may store local copies of information stored at frequently accessed memory addresses. These local copies may have shorter delays for accessing cached values to agents as compared to performing a memory access to a target memory address. When a memory access is made to a target address that is not currently cached, the addressed memory may be accessed, and values from a plurality of sequential addresses, including the target address, are read as a group and may then be cached to reduce future access times. When the cached information in a cache line becomes invalid or a determination that the cached information has not be accessed frequently, the cached information may be invalidated and marked for eviction, thereby allowing it to be overwritten by other information being accessed by the processors of the SoC.

SUMMARY

In an embodiment, an apparatus includes a cache controller circuit and a cache memory circuit that further includes cache memory having a plurality of cache lines. The cache controller circuit may be configured to receive a request to reallocate a portion of the cache memory circuit that is currently in use. This request may identify an address region corresponding to one or more of the cache lines. The cache controller circuit may also be configured to in response to the request, convert the one or more cache lines to directly-addressable, random-access memory (RAM) by excluding the one or more cache lines from cache operations.

In a further example, the cache controller circuit may be further configured to support a real-time virtual channel for memory transactions in the identified address region, and to prioritize a memory transaction received via the real-time virtual channel over a memory transaction received via a bulk virtual channel. In an example, the cache controller circuit may be further configured to determine that the address region is included in a secure-access region. In response to the determination, the cache controller circuit may be further configured to ignore a memory transaction in the address region from an agent that is unauthorized to access the secure-access region.

In another example, the cache controller circuit may also be configured to flush the one or more cache lines before the converting to the directly-addressable RAM. In an example, the cache controller circuit may be further configured, in response to data in a valid cache line being written, to issue a write-back request for the valid cache line. The cache controller circuit may also be configured to exclude the one or more cache lines from write-back requests.

In an embodiment, the cache controller circuit may be further configured to receive a different request to deallocate the portion of the cache memory from the directly-addressable RAM. In response to the different request, the cache controller circuit may be further configured to include the one or more cache lines in cache operations without copying data stored in the directly-addressable RAM while the one or more cache lines were reallocated. In another embodiment, the cache controller circuit may also be configured, in response to a memory transaction in the directly-addressable RAM received after deallocating the portion of the cache memory, to generate an error.

BRIEF DESCRIPTION OF THE DRAWINGS

The following detailed description makes reference to the accompanying drawings, which are now briefly described.

FIG. 7 shows a flow diagram of an embodiment of a method for reallocating a portion of a cache memory system to a directly-addressable address region.

FIG. 8 depicts a flow diagram of an embodiment of a method for receiving a memory transaction from an unauthorized agent, and for deallocating a portion of a cache memory system from a directly-addressable address region.

FIG. 9 illustrates, at two points in time, a block diagram of an embodiment of a system in which a buffer located in a system memory is allocated to a cache memory.

FIG. 10 shows, at two different points in time, a block diagram of an embodiment of the system of FIG. 9, in which an attempt to allocate a storage location to a cache memory is repeated.

FIG. 12 illustrates, at two different points in time, a block diagram of an embodiment of the system of FIG. 9, in which bulk transactions and real-time transactions are used in conjunction with a buffer and a cache memory.

FIG. 13 shows a flow diagram of an embodiment of a method for allocating a buffer to a cache memory system.

FIG. 15 illustrates a flow diagram of an embodiment of a method for determining a cache miss rate when accessing a buffer allocated to a cache memory.

Figure 1:
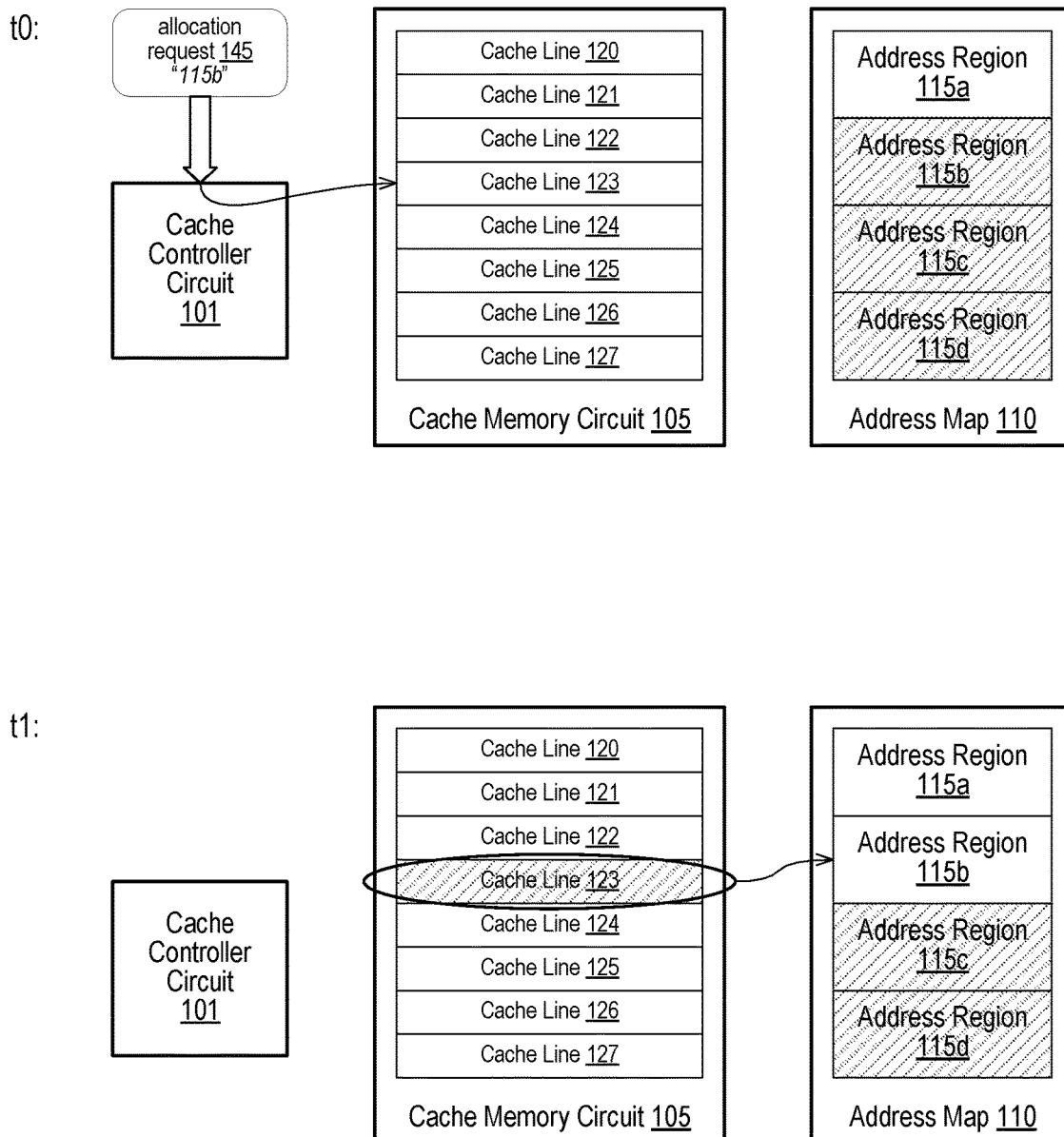
FIG. 1 illustrates, at two points in time, a block diagram of an embodiment of a system that includes a cache memory and an address map.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

Transactions may be classified into two or more priority levels, such as "real-time" and "bulk." A real-time transaction may have a higher priority level than a bulk transaction and, therefore, may be processed faster through the bus circuits and any intermediate agents through which the real-time transaction passes. Agents may use real-time transactions to satisfy deadlines to complete processing which, if not met, may lead to poor performance, incorrect calculations, or even failure in the system. For example, playback of a video may stall or glitch if low-latency deadlines are not met. Competition from other agents for access to bus circuits and memory circuits is one source of complication in meeting such low-latency deadlines.

Cache memories may be used to mitigate some of the complications for satisfying low-latency deadlines by storing copies of memory locations closer to a corresponding agent, thereby reducing a number of bus circuits and/or intermediate agents that a real-time transaction must traverse when being processed. In addition, if a plurality of cache memories is available, a given cache memory may be accessed by fewer agents, thereby increasing a probability that an agent may access the cache memory while satisfying low-latency deadlines. Cached values, however, may be evicted from a cache memory if not accessed frequently and/or if there is competition from other agents for caching values in the cache memory.

Accordingly, techniques for using cache memory to store values that are and/or will be used for real-time transactions is desired. Two general approaches for using cache memory to implement a faster access memory region are presented herein. In a first approach, a portion of a cache memory may be allocated to a system-bus accessible address region, where the addressable cache memory may be accessed in a similar manner as random-access memory (RAM). To implement such a technique, a control circuit may be used to allocate a portion of a cache memory as RAM. Cache lines in the allocated portion of the cache memory are flushed, and any dirty data (e.g., data that has been modified in the cache memory without updating corresponding memory locations in a system memory) is written back to the system memory. The cache lines in the allocated portion are enabled for access via a memory-mapped address region, and are removed from the available cache memory lines. Agents may then be able to directly access the memory-mapped address region with real-time transactions that can be processed in a similar amount of time as a cached location. Since the memory-mapped address region is not treated as a part of the cache during the allocation, values stored in this region are not at risk of being evicted if not accessed for a prolonged period of time. FIGS. 1-8, described below, illustrate various details for this cache-as-RAM approach.

In a second approach, a buffer is allocated within the system memory, in which the buffer is intended for use with low-latency memory transactions. To decrease latency for accessing values in this buffer, the buffer may also be allocated in the cache memory. In some embodiments, a cache may include support for high priority data, including techniques for associating a particular cache line with low-latency transactions. Such support may include restricting or eliminating evictions for the associated cache lines. However, cache allocation of a large buffer (e.g., a buffer sized for use with a video frame, other image, audio file, etc.) may begin to suffer cache misses as portions of the buffer that are allocated towards the end of the cache allocation process have a higher probability of mapping to cache lines now occupied by portions of the buffer that were previously cached. If the cache allocation begins with one end of the buffer, the opposite end will suffer a higher number of cache misses, making the cache misses more frequent as accesses to the buffer move towards the last portions to be allocated.

Disclosed techniques attempt to spread the cache allocation of portions of the buffer across various locations in the buffer. To accomplish this, the buffer may be logically divided into a plurality of blocks. Attempts may then be made to allocate a first sub-block from each block into cache. Subsequently, further attempts may be made to allocate a second sub-block from each block into cache. This may repeat for a number of sub-blocks in each block until an attempt has been made to cache all sub-blocks. Such a technique may distribute cache misses for various sub-block allocations across a whole of the buffer such that the misses are not concentrated towards an end of the buffer. For example, if the buffer is used for processing an image, then cache misses may occur more consistently, but with a lower concentration, across the processing of the entire image rather than having a few misses at a beginning of the processing of the image and then having more frequent misses as the processing nears the end of the image. As misses occur more frequently, more real-time transactions may be generated to retrieve the requested data from the system memory. Having a greater number of real-time transactions being processed concurrently may increase a likelihood of low-latency deadlines being missed, subsequently increasing a likelihood of poor performance or a system failure being experienced by a user of the system. FIGS. 9-13, described later in this disclosure, illustrate details regarding this distributed caching approach.

FIG. 1 illustrates a block diagram of one embodiment of a cache memory system at two points in time. As illustrated, system 100 includes cache controller circuit 101, cache memory circuit 105, and address map 110. Cache memory circuit 105 includes cache lines 120-127. Address map 110 is shown with four address regions 115a-115d (collectively address regions 115). System 100 may correspond to a processor circuit, such as a microprocessor, microcontroller, or other form of system-on-chip (SoC). System 100 may be implemented on a single integrated circuit or by use of multiple circuit elements coupled on a circuit board.

As illustrated, cache memory circuit 105 may be implemented using any suitable type of memory circuit design, such as static random-access memory (SRAM), dynamic RAM (DRAM), ferroelectric RAM (FeRAM or FRAM), magnetoresistive RAM (MRAM), flash memory, and the like. Cache memory circuit 105 may be organized using any suitable cache structure, including use of multiple ways and/or sets. Cache controller circuit 101 includes circuits for performing cache operations in cache memory circuit 105, such as maintaining cache tags, determining if an address related to a memory transaction is a hit (a cache line currently corresponds to the address) or miss (no cache line has been filled with data corresponding to the address), issuing cache-line fill requests in response to a miss, marking cache lines for eviction, and the like. Address map 110 includes any suitable combination of software, firmware, and hardware circuits for determining a physical address for memory-mapped registers and memory circuits. In some embodiments, address map 110 includes translation tables for converting logical addresses into physical addresses.

As shown, cache controller circuit 101 receives allocation request 145 at time t0. Cache controller circuit 101 is configured to receive allocation request 145 to reallocate a portion of cache memory circuit 105 that is currently in use. Allocation request 145 identifies one of address regions 115 (e.g., address region 115b) which corresponds to one or more of cache lines 120-127 (e.g., cache line 123). Cache controller circuit 101 receives allocation request 145 at time t0, at which point, cache memory circuit 105 has been in use and one or more of cache lines 120-127 may be in use to cache locations in a system memory (not shown). Allocation request 145 may indicate address region 115b by inclusion of an address value that corresponds to address region 115b. In other embodiments, other forms of indications may be used to identify address region 115b, such as an index value corresponding to address region 115b.

Each of address regions 115 may, when active, correspond to a plurality of addresses corresponding to memory locations in cache memory circuit 105, such as one or more of cache lines 120-127. When a particular one of address regions 115 is active, the corresponding cache line(s) are not used for caching data, but rather are used as RAM. When an address region is inactive, the corresponding cache line(s) may be used for caching data values. Addresses associated with an inactive address region may be treated as an illegal address, and therefore, may generate an exception if included in a transaction. At time t0, address region 115b is not active (as indicated by the hashing in FIG. 1) and, therefore, no data values may be stored within the region. Address regions 115c and 115d are also inactive, while address region 115a is currently active. In some embodiments, address region 115a may correspond to a main system memory and include addresses for all memory locations and memory-mapped registers that are always enabled when system 100 is active.

In response to allocation request 145, cache controller circuit 101 may be further configured to convert, at time t1, cache line 123 to directly-addressable, random-access memory (RAM) by excluding cache line 123 from cache operations. Cache line 123 may then be addressed directly using memory transactions addressed to the locations within address region 115b. For example, activating address region 115b may include modifying address map 110 such that transactions addressed to locations within address region 115b are routed to memory cells that correspond to cache line 123. In addition, cache controller circuit 101 may further set an indication that cache line 123 is unavailable and that no cached data is currently stored in cache line 123. For example, cache controller circuit 101 may set one or more bits in a cache tag corresponding to cache line 123 that provide such indications.

Use of such a cache-to-RAM technique may enable a process executing in system 100 to allocate, at any point in time that the system is active, a portion of cache memory circuit 105 for use as directly addressable RAM. As previously described, such an allocation may allow a particular agent to reserve memory space with low-latency access times for use with data related to high priority transactions, such as real-time transactions. Allocating this space in cache memory circuit 105 may further prevent other agents from gaining use of the allocated portion until the particular agent is done with the real-time transactions and may deallocate the portion for use as cache line 123 again.

It is noted that system 100, as illustrated in FIG. 1, is merely an example. The illustration of FIG. 1 has been simplified to highlight features relevant to this disclosure. Various embodiments may include additional elements and/or a different configurations of the elements. For example, only eight cache lines and four address regions are shown. Any suitable number of cache lines and address regions may be implemented in other embodiments. Although address region 115b is shown as corresponding to a single cache line, in other embodiments, address region may correspond to any suitable number of cache lines as well as to a portion of a cache line.

The system illustrated in FIG. 1 is shown in a simplified depiction. Cache memory systems may be implemented in various fashions. Another example of a system with a cache memory is shown in FIG. 2.

Figure 2:
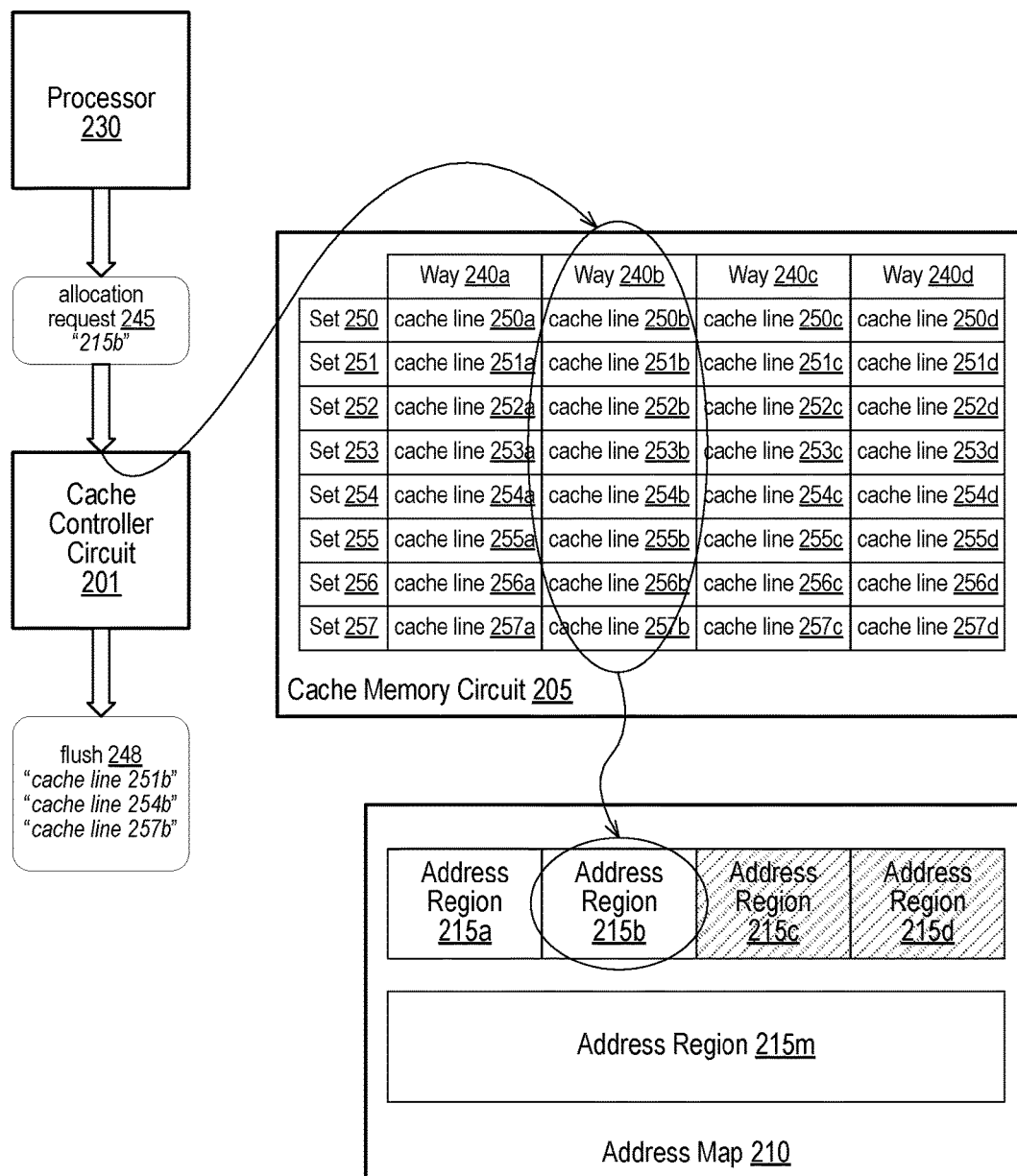
FIG. 2 shows a block diagram of an embodiment of a system that includes a processor, a cache memory with a plurality of ways, and an address map.

Moving to FIG. 2, a block diagram of an embodiment of a cache memory system that employs use of ways in a cache memory circuit is shown. System 200, as illustrated, includes cache controller circuit 201, cache memory circuit 205, address map 210, and processor 230. Processor 230 may correspond to a general-purpose processing core, or other type of processing circuit capable of processing data and issuing memory requests. Except as described below, elements of system 200 perform functions as described for similarly named and number elements of FIG. 1.

As shown, cache memory circuit 205 includes cache memory having a plurality of ways 240a-240d, as well as a plurality of sets 250-257. Processor 230 is configured to issue memory requests using address map 210 that includes active and inactive address regions 215. In the illustrated embodiment, address region 215m is always active when system 200 is active and may include addresses for a main system memory as well as various registers. When processor 230 issues a memory request to system memory (e.g., an address in address region 215m), a fetch address included in the memory fetch is used by cache controller circuit 201 to determine if a cache line in cache memory circuit 205 currently holds valid values for the system memory locations corresponding to the fetch address. To make such a determination, cache controller circuit 201 may use the fetch address to identify a particular one of sets 250-257. For example, cache controller circuit 201 may use at least a portion of the fetch address in a hashing algorithm to determine a particular hash value. This hash value may then be used to identify a particular one of sets 250-257. Each of sets 250-257 include at least one cache line from each of ways 240. If a cache line in any of the ways 240 for the particular set holds valid values corresponding to the fetch address, then the memory request is said to "hit" in cache memory circuit 205. Otherwise, the memory request is a "miss" in cache memory circuit 205. Use of multiple ways may enable some flexibility in how cache controller circuit 201 maps fetched values into cache lines of cache memory circuit 205.

As described above, cache memory circuit 205 may provide a lower-latency access, also referred to as a higher quality-of-service (QoS), than access to the system memory, such as in address region 215m. Under certain conditions, processor 230 may be required to process a block of data with a high QoS deadline. Since processing data out of system memory may jeopardize successful processing of the data within limits of the high QoS deadline, processor 230 may send allocation request 245 to cache controller circuit 201 to request that a portion of cache memory circuit 205 is reallocated.

Cache controller circuit 201, as shown, is configured to receive allocation request 245 from processor 230 to reallocate a portion of cache memory circuit 205 as directly-addressable memory. Allocation request 245 identifies address region 215b which, at the time of receiving allocation request 245, is inactive. For example, allocation request 245 may include a particular address value or other type of indication that identifies address region 215b. Based on allocation request 245, cache controller circuit is further configured to select a portion of ways 240 to convert. As depicted, each of ways 240 may correspond to one of address regions 215 including, as indicated, way 240b corresponding to address region 215b. In other embodiments, cache memory circuit 205 may include additional ways such that two or more ways may be associated with a given address region. Allocation request 245 may also indicate more than one address region, such as address regions 215b and 215c. In some embodiments, the portion of ways 240 may be one-half, or other proportion, of a particular way. For example, way 240b may include multiple cache lines in each of sets 250-257, such as two lines per set. In such embodiments, one of the two cache lines from each of sets 250-257 may be reallocated, thereby leaving half of way 240b for use as cache while the other half is reallocated to address region 215b.

To convert way 240b, cache controller circuit 201 may be configured to set respective indications in cache tags corresponding to particular cache lines included in the selected portion of ways. Cache lines 250b-257b are included in way 240b and, as shown, are selected for reallocation to address region 215b. Adding respective indications to cache tags for each of cache lines 250b-257b removes the corresponding cache line from use as cache memory. Such indications may cause cache controller circuit 201 to ignore cache lines 250b-257b when determining whether a received memory request hits or misses in cache memory circuit 205, and may further prevent cache controller circuit 201 from mapping an address from a cache miss to any of cache lines 250b-257b. Accordingly, cache lines 250b-257b are effectively removed from cache memory usage while these indications in the cache tags are set.

Cache controller circuit 201 is further configured to map cache lines 250b-257b in way 240b for use in the identified address region 215b. Address region 215b, as illustrated, includes a number of addresses that may be reserved for use with reallocated cache lines 250b-257b, and therefore, may not be mapped to any other memory locations or registers. When address region 215b is inactive, an attempt to access these addresses may result in generation of an exception, and/or return of a default value. Cache controller circuit 201 may further be configured to set respective real-time indicators in the cache tags corresponding to the particular cache lines 250b-257b. Such real-time indicators may denote that cache lines 250b-257b and, therefore, addresses in address region 215b, are associated with real-time transactions with higher priorities than bulk transactions. Accordingly, a memory accesses to any of the reallocated cache lines 250b-257b may be treated as real-time transactions even if a real-time transaction is not explicitly used in the memory access.

Furthermore, cache controller circuit 201 may be further configured to flush one or more of cache lines 250b-257b in way 240b prior to mapping way 240b for use in address region 215b. Since cache memory circuit 205 may be in use prior to processor 230 issuing allocation request 245, one or more of the cache lines in way 240b may be used to cache memory locations, such as locations in address region 215m. If currently cached values match values in the respective locations in address region 215m, then these values may simply be cleared or ignored when the respective cache line is mapped to address region 215b. If, however, a value cached in way 240b has been modified but not yet written back to address region 215m, then such a value may be referred to as "dirty" and a flush command issued to write dirty values back to the system memory locations in address region 215m. For example, cache lines 251b, 254b, and 257b, in the illustrated example, include dirty data. Cache controller circuit 201 issues flush command 248 to write-back the dirty values in these cache lines to the corresponding locations in address region 215m. One or more flush commands may be issued before converting the cache lines of way 240b to directly-addressable memory locations in address region 215b.

After processing the block of data with the high QoS deadline, processor 230 may not have an immediate use for high QoS directly-addressable memory in address region 215b, and may be configured to issue a request to deallocate way 240b. Cache controller circuit 201 may be further configured, in response to receiving the request to deallocate the directly-addressable memory in address region 215b, to include way 240b in cache operations. Values stored in the directly-addressable memory while way 240b was reallocated is not relocated in response to the request to deallocate the directly-addressable memory. Any values written to address region 215b during the reallocation may be deleted or ignored, and subsequently overwritten as way 240b is returned to use in operations of cache memory circuit 205.

It is noted that the use of ways 240 of cache memory circuit 205 to reallocate cache memory to directly addressable memory may be implemented with an acceptable amount of additional logic circuits, while allowing continuing operation of cache memory circuit 205 with little to no interruption. Implementing the reallocation of cache memory on an individual cache line basis may, in contrast, require the additional of a larger logic circuit, particularly if the cache memory is large and/or has many sets and ways. Further limiting an amount of cache memory that can be reallocated, on the other hand, may not provide adequate resolution to manage between needs for high QoS memory locations and ongoing cache operations. For example, if reallocation of cache memory circuit 205 is limited to half of the cache, the amount of memory being allocated may be much larger than necessary for processing the high QoS data and further reduce a capacity of the cache, and possibly reducing an efficiency of agents utilizing the cache.

It is also noted that the embodiment of FIG. 2 is one depiction of a cache memory system. Although only four ways and eight sets are shown, in other embodiments, any suitable number of cache ways and sets may be included. In addition, although five address regions are depicted, address map 210 may be divided into any suitable number of regions.

Figure 3:
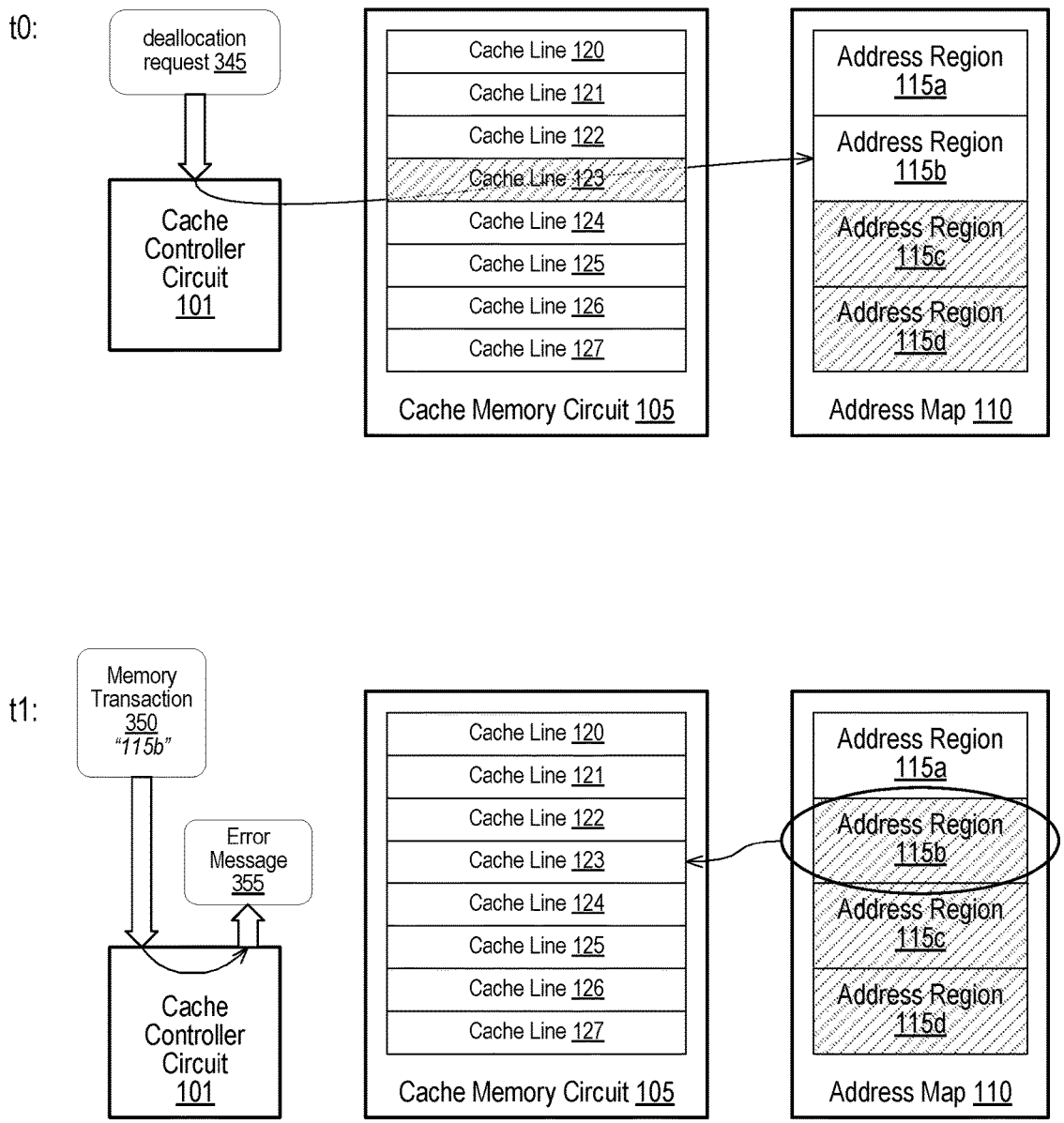
FIG. 3 depicts, a block diagram of an embodiment of the system of FIG. 1 at two different points in time.

The description of FIG. 2 described a deallocation of a directly-addressable memory locations. Deallocation of a directly-addressable memory region back to cache memory may be implemented in various fashions. FIG. 3 depicts such a fashion.

Turning to FIG. 3, the system of FIG. 1 is again illustrated at two different points in time. System 100, as described in reference to FIG. 1, includes cache controller circuit 101, cache memory circuit 105, and address map 110. At time t0, cache line 123 is mapped to directly addressable memory in address region 115b, and is therefore unavailable for cache operations. As illustrated, cache controller circuit 101 is configured to receive, e.g., from an agent such as processor 230 in FIG. 2, deallocation request 345 to deallocate cache line 123 from the directly-addressable memory in address region 115b. In response to deallocation request 345, cache controller circuit 101 is further configured to include cache line 123 in cache operations without copying data stored in the directly-addressable memory while cache line 123 was reallocated to address region 115b. For example, as described above, cache controller circuit 101 may have set an indication in an associated cache tag for cache line 123 to indicate that cache line 123 was reallocated to directly-addressable memory. To deallocate cache line 123, cache controller circuit 101 may clear this indication, thereby removing cache line 123 from address region 115b and including cache line 123 in subsequent cache operations.

Values written to cache line 123 while allocated to address region 115b may be deleted or ignored when the indication in the associated cache tag is cleared. Since addresses in address region 115b may not be implemented elsewhere in address map 110, no write-back requests may be issued to copy these values. Unless an agent utilizing address region 115b while it is active explicitly copies the data from address region 115b to other locations in address map 110, the values in address region 115b may be lost after the deallocation is complete.

At time t1, memory transaction 350 is issued by an agent to access a value in address region 115b. Cache controller circuit 101 is configured, in response to memory transaction 350 being received after deallocating address region 115b, to generate error message 355. In some embodiments, error message 355 may be generated if memory transaction 350 includes a write to, or modification of, an address in address region 115b. Otherwise, if memory transaction 350 includes only read accesses to address region 115b, then cache controller circuit 101 may, instead of, or in addition to, generating error message 355, return a particular default value, such as all zero bits or all one bits, to the requesting agent. Generating error message 355 may be implemented using a variety of techniques. For example, error message 355 may be generated by asserting an exception signal that, in turn, causes a particular process to be executed by one or more processor cores in system 100. Generating error message 355 may include returning a particular value that indicates to the agent that issued memory transaction 350 that address region 115b has been deallocated.

Figure 4:
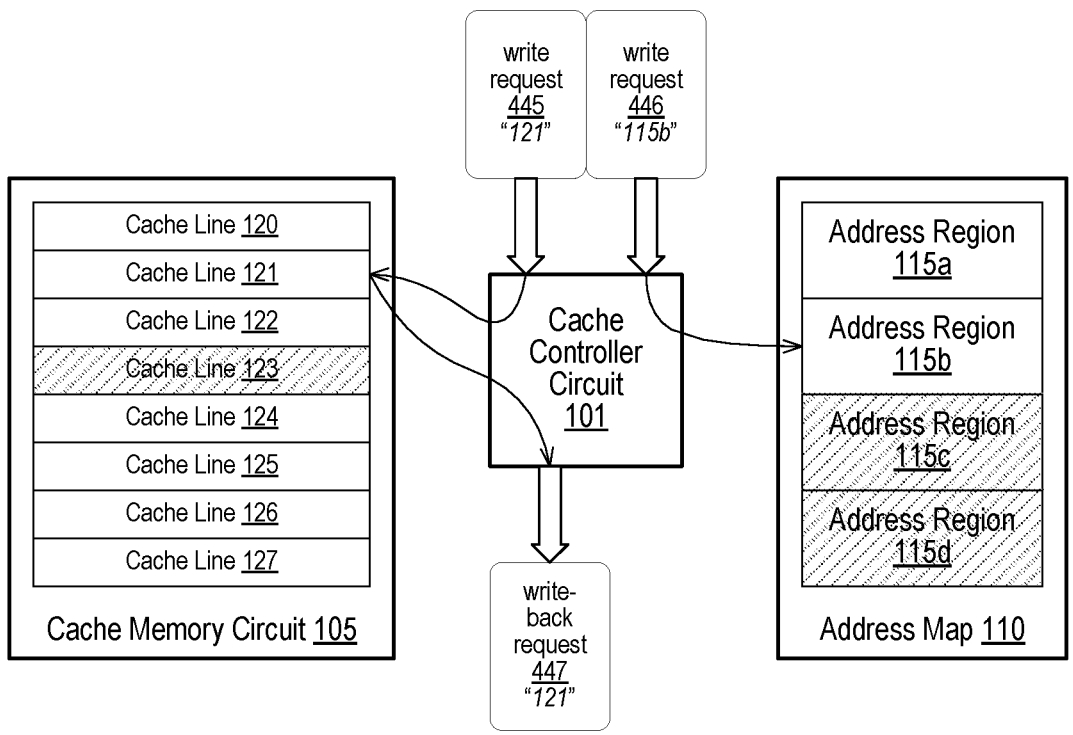
FIG. 4 illustrates a block diagram of an embodiment of the system of FIG. 1 receiving two write requests.

FIG. 3 depicts deallocation of cache lines from an directly-addressable address region. Proceeding to FIG. 4, system 100 is depicted with address region 115b active (using cache line 123) and illustrates how cache operations and access to address region 115b may be handled concurrently. System 100, in FIG. 4, shows cache controller circuit 101 receiving write requests 445 and 446.

As shown, write request 445 includes a write request to write data to one or more locations that are currently cached in cache line 121 of cache memory circuit 105. In a similar manner, write request 446 includes a write request to write data to one or more locations in address region 115b that is implemented by reallocating cache line 123 from cache memory circuit 105 to address map 110. Cache controller circuit 101 is configured, in response to write request 445, to issue write-back request 447 for cache line 121. The modified values in cache line 121 are included in write-back request 447, along with corresponding target addresses in a system memory. Write-back request 447 causes these modified values to be updated at the target addresses in the system memory. If cache line 121 is evicted and then mapped to different addresses in the system memory, then the target addresses in the system memory may still have up-to-date values.

Cache controller circuit 101, as illustrated, is further configured to exclude the cache line 123 from write-back requests. Write request 446 may modify one or more values in address region 115b (including cache line 123). Despite values in cache line 123 being modified, cache controller circuit 101 is configured to ignore these modifications in regards to write-back commands. Address region 115b, although including cache line 123, is treated as an endpoint memory destination. No target address in the system memory corresponds to the addresses in address region 115b. Accordingly, modified values stored in cache line 123 may not be updated in another memory circuit in response to write request 446.

It is noted, however, that a different cache memory may reside between cache memory circuit 105 and a processing circuit that issues write request 446. For example, cache memory circuit 105 may be an L2 cache and the processing circuit that issues write request 446 may include an L1 cache. In such an embodiment, the L1 cache may cache at least some values stored in address region 115b (e.g., in cache line 123).

It is further noted that the embodiments of FIGS. 3 and 4 are merely examples for demonstrating disclosed concepts. System 100 shown in these figures is simplified for clarity. In other embodiments, additional elements may be included, such as one or more agents that issue memory transactions that cause the described operations. Additionally, although FIGS. 3 and 4 utilize system 100 of FIG. 1, the described techniques may be applied to system 200 of FIG. 2.

Figure 5:
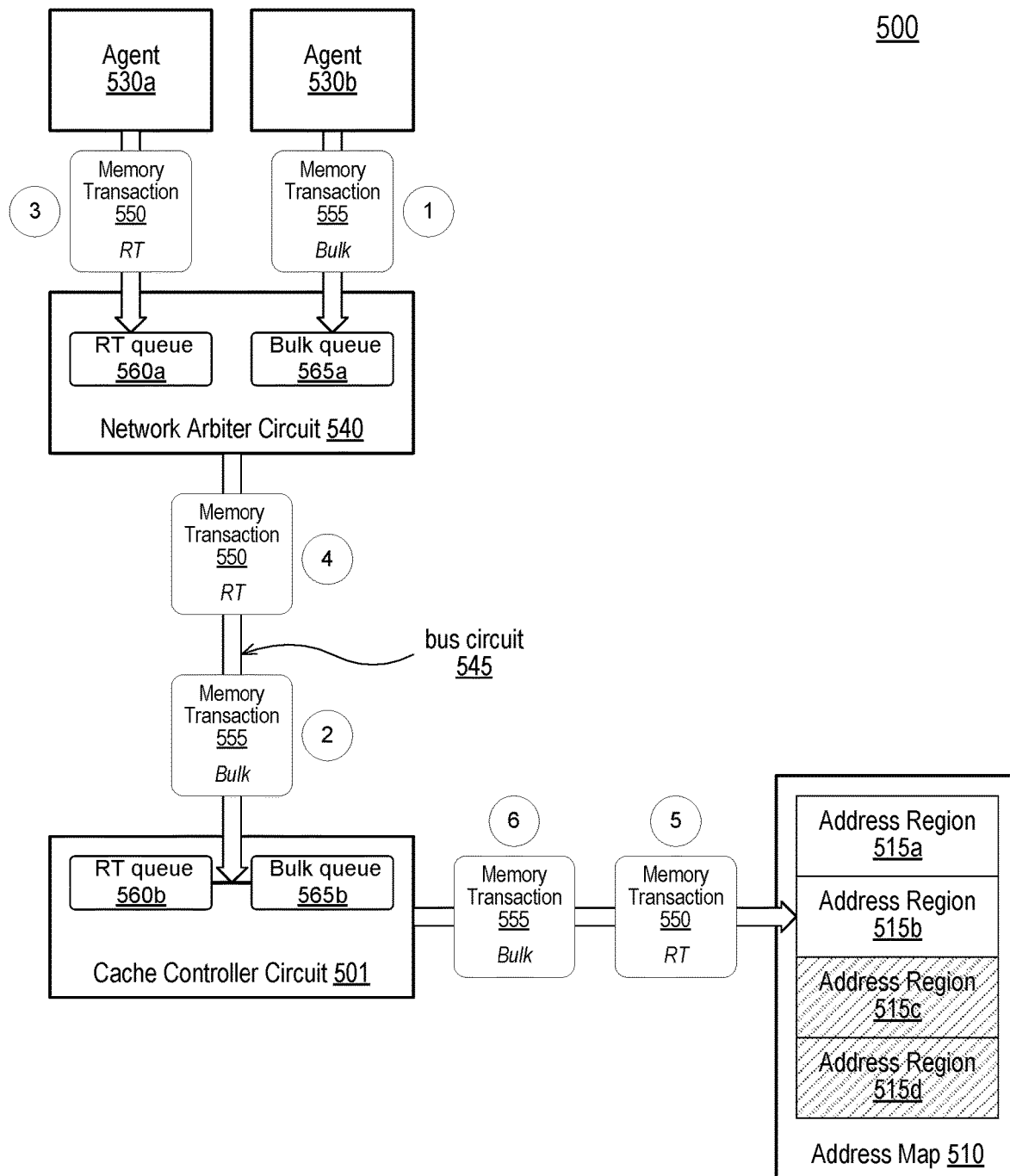
FIG. 5 shows a block diagram of an embodiment of a system that includes two agents sending memory transactions, via a network arbiter, to a cache memory.

Use of real-time transactions is described above, in various capacities, as being used along with the disclosed techniques. Both real-time and bulk transactions may be used for memory requests targeting the cache-based address regions described herein. FIG. 5 illustrates an example of how use of transactions with different QoS levels may be implemented.

Moving now to FIG. 5, a system is depicted in which arbiters are used to schedule transactions across a system network. System 500 includes cache controller circuit 501 and address map 510, which may correspond to similarly named and numbered elements in FIGS. 1, 3, and 4, except as described below. System 500 further includes agents 530a and 530b (collectively agents 530), network arbiter circuit 540, and bus circuit 545. FIG. 5 illustrates a flow of two memory transactions (memory transactions 550 and 555 that are a real-time transaction and bulk transaction, respectively) addressed to address region 515b which is implemented using one or more cache lines from cache controller circuit 501 using a technique such as described above.

At a first point in time, agent 530b issues the bulk memory transaction 555 with a destination in address region 515b. In a manner similar as address regions 115b and 215b in FIGS. 1 and 2, address region 515b includes a portion of a cache memory associated with cache controller circuit 501. As illustrated, memory transaction 555 is received by network arbiter circuit 540 on its way to cache controller circuit 501. Since memory transaction 555 is a bulk transaction, network arbiter circuit 540 places memory transaction 555 into bulk queue 565a until bus circuit 545 has available bandwidth to forward memory transaction 555 to cache controller circuit 501.

Bus circuit 545 includes a set of wires coupling cache controller circuit 501 to network arbiter circuit 540. In some embodiments, bus circuit 545 may include a sufficient number of wires to support independent physical bulk and real-time channels. As shown, however, bus circuit 545 does not include such a number of wires and, therefore, both real-time and bulk memory transactions are transferred using the same set of wires, utilizing virtual bulk and real-time channels to support the respective QoS levels for each type of transaction. Accordingly, network arbiter circuit 540 uses a prioritization scheme for selecting between real-time (RT) queue 560a and bulk queue 565a for a next transaction to send via bus circuit 545. For example, network arbiter circuit 540 may send transactions in RT queue 560a first, and then send transactions in bulk queue 565a after RT queue 560a is empty. In other embodiments, additional considerations may be included in the selection process to avoid bulk queue 565a reaching a full state or having a bulk transaction stall in bulk queue 565a for an excessive amount of time.

As used herein, a "channel" is a medium used to transfer information between a source agent (e.g., a processor circuit) and a destination agent (e.g., a memory circuit). A channel may include wires (including conductive traces on a circuit board or integrated circuit) and various other circuit elements. In some embodiments, a channel may further include antennas and electromagnetic waves of a particular frequency or range of frequencies. A "physical" channel refers to the circuit elements comprising a channel. A "virtual" channel refers to two or more different "channels" implemented over a same physical channel. Virtual channels may be implemented using a variety of techniques. For example, the virtualization of a channel may be implemented in a channel interface by including respective queues for each virtual channel. An agent sends and receives transactions across a given channel using the queue for the respective channel. Other circuits may then control channel arbitration between the respective queues to select specific transactions to send when the channel is available. In other embodiments, an agent may be responsible for associating various transactions to corresponding virtual channels. In such embodiments, the agent may maintain appropriate data structures for assigning transactions to appropriate virtual channels, and then arbitrating to select a given transaction to send when the channel is available.

At a second point in time, network arbiter circuit 540 selects memory transaction 555 from bulk queue 565a and forwards it to cache controller circuit 501. Cache controller circuit 501 may, in turn, place memory transaction 555 into bulk queue 565b until bandwidth is available to process memory transaction 555 in address region 515b. Meanwhile, at a third point in time after the second point, agent 530a sends memory transaction 550 to cache controller circuit 501, via bus circuit 545. network arbiter circuit 540 receives the real-time memory transaction 550 and places it in RT queue 560a. At a subsequent fourth point in time, memory transaction 550 is selected by network arbiter circuit 540 and sent to cache controller circuit 501, which places the received memory transaction 550 in RT queue 560b.

In the illustrated example, both memory transactions 550 and 555 are in RT queue 560b and bulk queue 565b, respectively. Cache controller circuit 501 is configured to support the real-time and bulk virtual channels for memory transactions in address regions 515a-515d. Accordingly, cache controller circuit 501, using a selection scheme similar to network arbiter circuit 540, prioritizes memory transaction 550 received via the real-time virtual channel over memory transaction 550 received via the bulk virtual channel. At a fifth point in time, after the fourth point, cache controller circuit 501 skips memory transaction 555 waiting in bulk queue 565b and instead, selects memory transaction 550 waiting in RT queue 560b. Later, at a sixth point in time, memory transaction 555 satisfies the selection criteria and is processed in address region 515b.

It is noted that system 500 is an example for highlighting disclosed techniques. FIG. 5 is simplified for clarity. In other embodiments, additional elements may be included, such as additional agents, multiple bus circuits, associated network arbiter circuits, and the like.

FIG. 5 depicts how memory transactions with different levels of QoS may be handled using the disclosed techniques. The disclosed cache controller circuit may be further configured to manage address regions that fall within different types of secure memory regions. A description of such an embodiment is presented next.

Figure 6:
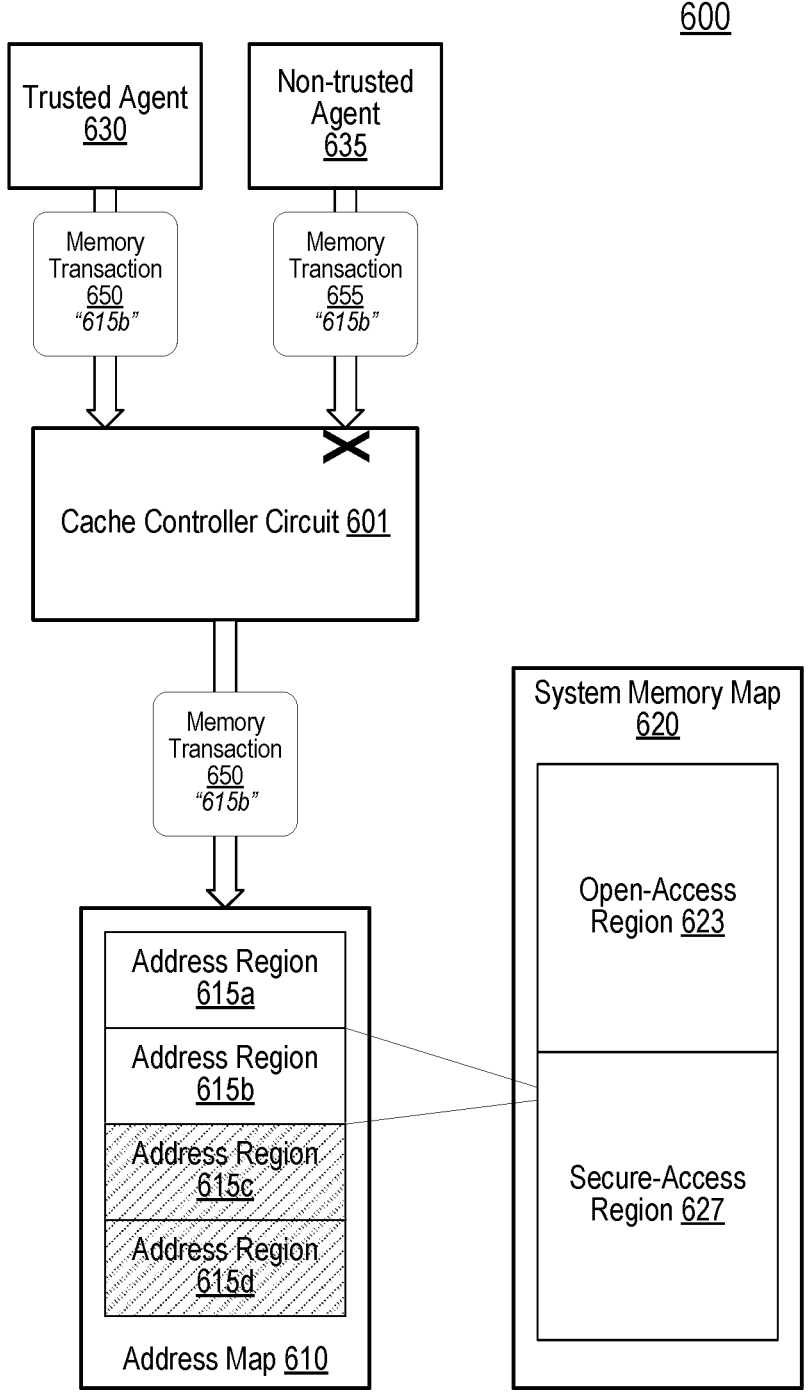
FIG. 6 illustrates a block diagram of an embodiment of a system that includes two agents, one trusted and one non-trusted, sending memory transactions to a cache memory.

Turning to FIG. 6, an embodiment of a system that includes support for open-access and secure-access memory regions is shown. System 600 includes cache controller circuit 601, address map 610, system memory map 620, trusted agent 630, and non-trusted agent 635. System memory map 620, as shown, is divided into two regions, open-access region 623 and secure-access region 627. Address region 615b in address map 610 corresponds to reallocated cache memory, as previously described, and is mapped within secure-access region 627. Trusted agent 630 and non-trusted agent 635 issue memory transactions 650 and 655, respectively, both targeting a destination address in address region 615b.

System memory map 620, as illustrated, includes a memory map of all address regions included in system 600. These address regions may be classified into two types of security regions: open-access region 623 and secure-access region 627. Open-access region includes all memory ranges for which any agent within system 600 (including both trusted agent 630 and non-trusted agent 635) may issue memory transactions. Open-access region may include memory used for general application usage, including for example, memory used for processing images, audio files, and execution of general applications. Secure-access region 627 includes memory ranges that have restricted access. Only agents classified as trusted, such as trusted agent 630, may access memory locations within secure-access region 627. A memory transaction from a non-trusted agent to an address in secure-access region 627 may be ignored or may result in generation of an error indication, such as an exception.

In the illustrated example, both trusted agent 630 and non-trusted agent 635 issue respective memory transactions 650 and 655 for a destination address in address region 615b. To support secure-access regions, cache controller circuit 601 is configured to determine that address region 615b is included in secure-access region 627. In response to the determination, cache controller circuit 601 is configured to ignore memory transaction 655 from non-trusted agent 635 that is unauthorized to access secure-access region 627. Trusted agent 630, however, is authorized to access secure-access region 627, and therefore, cache controller circuit 601 is configured to process memory transaction 650 in address region 615b.

In response to receiving memory transaction 655, cache controller circuit 601 may be further configured to generate an error indication. For example, cache controller circuit 601 may return an error code to non-trusted agent 635, the error code including a particular value indicative of an access to an unauthorized address. Cache controller circuit 601 may, instead or in addition, be further configured to assert one or more exception signals, such as an illegal address exception and/or a security violation exception.

It is noted that system 600 is merely an example. Various elements may be omitted from system 600 for clarity. In other embodiments, system 600 may include additional secure-access regions. For example, a plurality of different secure-access regions may be implemented, with each region corresponding to a different level of secure access, and therefore, accessible by different combinations of trusted agents.

The circuits and techniques described above in regards to FIGS. 1-6 describe various techniques for reallocating a portion of a cache memory to a directly-addressable address region. A variety of methods may be utilized for implementing these disclosed techniques. Two such methods are described below in reference to FIGS. 7-8.

Moving now to FIG. 7, a flow diagram is shown for an embodiment of a method for reallocating a portion of a cache memory circuit to a directly-addressable address region. Method 700 may be performed by a cache controller circuit, such as cache controller circuits 101, 201, 501, and 601 in FIGS. 1, 2, 5, and 6, respectively. Method 700 may be performed by a processing circuit executing software or firmware, by hardware circuits including, for example, logic gates, or a combination thereof. Referring collectively to FIGS. 1 and 7, method 700 begins in block 710.

At block 710, method 700 includes receiving, by cache controller circuit 101, allocation request 145 to reallocate a portion of cache memory circuit 105, that is currently in use, to a directly-addressable memory space. As shown, allocation request 145 identifies inactive address region 115b. Allocation request 145 may be received at time t0, at which point, cache memory circuit 105 has been in use and one or more of cache lines 120-127 may be in use to cache locations in a system memory. Address region 115b may be indicated by inclusion, in allocation request 145, of an address value in address region 115b, or an index value corresponding to address region 115b.

Method 700, at block 720, further includes, based on the identified address region 115b, selecting cache line 123 of cache memory circuit 105 to convert. As illustrated, cache line 123 may be associated with address region 115b due to software executed in system 100, such as an operating system. In other embodiments, cache line 123 may be hardcodes to address region 115b based on a circuit design of system 100. Although only one cache line is shown as being selected for use in address region 115b, any suitable number of cache lines may be selected. For example, as described in reference to FIG. 2, a cache memory circuit may include a plurality of ways, and an entire way or multiple ways, may be selected for use in a directly-addressable address region.

At block 730, method 700 also includes setting, by cache controller circuit 101, a respective indication for selected cache line 123 to exclude cache line 123 from further cache operations. For example, cache controller circuit 101 may set a particular bit or group of bits in a cache tag corresponding to cache line 123 to indicate usage of cache line 123 in address region 115b. In addition, cache controller circuit 101 may set a real-time memory indicator that denotes that cache line 123 is associated with real-time transactions with higher priorities than bulk transactions. Such an indication may prevent cache controller circuit 101 from performing an eviction of contents of cache line 123 after it has been reallocated to address region 115b. A real-time indication may further prioritize any transactions with an address in address region 115b as the destination, over any bulk transactions in queue for cache controller circuit 101.

In some embodiments, method 700 may further comprising flushing, by cache controller circuit 101, cache line 123 prior to setting the respective indication. Since cache memory circuit 105 has been in use prior to the receiving of allocation request 145, valid data may be cached in cache line 123. If any value in cached in cache line 123 has been modified and this modification has not been written back to a destination location in the system memory, then a flush command may be issued by cache controller circuit 101 that generates write-back requests for any location with modified values currently cached in cache line 123. After the write-back requests have been issued, then cache line 123 may be available for use in address region 115b.

Use of a portion of cache memory as a directly-addressable address region may enable a low-latency memory range that can be used by a particular agent for performing memory accesses that have a high QoS deadline which may not be achievable by direct addresses to the system memory, even if typical caching techniques are employed for the system memory accesses. By creating a low-latency memory region using cache memory circuits, the particular agent may be able to buffer data to be processed in this low-latency memory region without risk of the buffered data being evicted from cache if not accessed within a particular timeframe.

While address region 115b is active, cache lines 120-122 and 124-127 may be used for cache operations in cache memory circuit 105. For example, data written to a particular address that is currently cached in cache memory circuit 105 may be written-back to the particular address in the system memory. Cache line 123, however, is not used for cache operations. For example, data written to a different address that is in cache line 123 in address region 115b is not written-back to the system memory. Instead, cache line 123 may be used as a final destination for data written to address region 115b.

Method 700 may end in block 730, or may repeat some or all operations. For example, method 700 may return to block 710 in response to another allocation request being received by cache controller circuit 101. In some embodiments, multiple instances of method 700 may be performed concurrently. For example, cache controller circuit 101 may be capable of processing a second allocation request while still performing a first allocation request. If system 100 includes multiple cache controller circuits (e.g., for respective cache memory circuits), then each cache controller circuit may be capable of performing method 700 in parallel. It is noted that the method of FIG. 7 is merely an example for allocating a portion of a cache memory as a directly-addressable address region.

Turning now to FIG. 8, a flow diagram for an embodiment of a method for operating and deallocating a directly-addressable address region that utilizes a portion of a cache memory is shown. In a similar manner as method 700, method 800 may be performed by a cache controller circuit, such as cache controller circuit 101, 201, 501, and 601 as shown in FIGS. 1, 2, 5, and 6, respectively. Method 800 may also be performed by a processing circuit executing software or firmware, by a hardware circuit, or a combination thereof. Referring collectively to FIGS. 1, 3, and 8, method 800 begins in block 810 with cache line 123 already reallocated to address region 115b.

Method 800 includes, at block 810, receiving, by cache controller circuit 101, from an unauthorized agent, a memory transaction for address region 115b. As described above in reference to FIG. 6, a system memory map for system 100 may include an open-access region and one or more secure-access regions. Various agents may attempt to access address region 115b, some of which may be authorized to access one or more of the secure regions while other agents may not have authorization to access any addresses except those in the open-access region.

At block 820, method 800 includes, in response to determining that address region 115b is part of a secure access region, ignoring, by cache controller circuit 101, the memory transaction from the unauthorized agent. As illustrated, an address included in the received memory transaction targets a location in address region 115b. Address region 115b, may be determined to be within a secure-access region of the system memory map to which the unauthorized agent does not have access. In response to this determination, the received memory transaction is ignored. As described above, an error message may be returned to the unauthorized agent, and/or an exception signal asserted to indicate, e.g., to an operating system, that an unauthorized access was attempted.

At block 830, the method also includes receiving, by cache controller circuit 101, deallocation request 345 to deallocate cache line 123 of cache memory circuit 105 from the directly-addressable address region 115b. An agent that was using address region 115b may complete activities that initiated a request to reallocate cache line 123 to address region 115b. For example, a processor may have requested activation of address region 115b in response to a launch of a particular application or process within an application. Once the application, or process, has completed, then address region 115b may not be needed, and therefore can be returned to use in cache memory circuit 105, thereby increasing an amount of data that may be cached at a given time.

Method 800 further includes, at block 840, in response to deallocation request 345, including cache line 123 in cache operations. As illustrated, cache line 123 is returned to cache memory circuit 105 for use as cache memory. For example, if one or more bits in a cache tag corresponding to cache line 123 were set to include cache line 123 in address region 115b, then these bits may be cleared to return cache line 123 to cache memory circuit 105. Data stored in address region 115b while cache line 123 was reallocated may be overwritten without a write-back to a system memory circuit. Values stored in address region 115b may need to be explicitly copied to other memory locations through use of respective memory transactions before cache line 123 is deallocated. Otherwise, any values from address region 115b may be lost after deallocation.

The method, at block 850, further includes returning a default value in response to a read request for an address in address region 115b received after deallocating cache line 123 of cache memory circuit 105. As illustrated, if memory transaction 350 is directed to an address in address region 115b after deallocation request 345 has been performed, then a default value, indicative of an access to an inactive address, is returned to an agent that issued memory transaction 350.

At block 860, method 800 also includes generating an error by cache controller circuit 101 in response to a write request to an address in address region 115b received after the deallocating. In addition to block 850, or in some embodiments, in place of block 850, an error may be generated, such as an assertion of an exception signal. Such an error may provide an indication to a supervisory processor, a security circuit, an exception handler circuit or process, and/or other hardware circuits or software processes, that an access to an inactive address has been made. In some cases, such an access may be indicative an improperly operating system and a recovery operation may be initiated, such as a system reset or exception routine.

In some embodiments, method 800 may end in block 860, or in other embodiments, may repeat some or all operations. For example, method 800 may return to block 830 to deallocate a different address region in response to a different deallocation request. It is noted that operations of method 800 may be performed in a different order, in whole or in part. For example, blocks 810 and 820 may be performed one or more times before block 830 is performed an initial time. Blocks 830-860 may be performed without blocks 810 and 820 being performed.

Performance of various operations of methods 700 and 800 may be performed concurrently and/or in an interleaved fashion. For example, cache controller circuit 101 may be configured to manage multiple address regions concurrently, thereby allowing for different processor circuits to utilize different directly addressable address regions in an overlapping fashion. Accordingly, method 800 may be performed, in whole or in part, while method 700 is in progress.

FIGS. 1-8 depict various embodiments of a cache-as-RAM technique in which a portion of a cache memory is allocated to a system-bus accessible address region, thereby enabling a low-latency memory region for a given agent or group of agents. FIGS. 9-15, described below, depict a distributed buffer technique in which a buffer is allocated within system memory, and then allocated into a cache memory using a particular order that attempts to distribute cache misses across an entirety of the buffer.

Proceeding to FIG. 9, a block diagram of an embodiment of a system that includes a cache memory is illustrated at two points in time. As shown, system 900 includes processing circuit 901, cache memory circuit 905, and system memory circuit 910. Cache memory circuit 905 includes cache lines 920a-920h (collectively cache lines 920). System memory circuit 910 is shown with nine storage locations 935a-935i (collectively locations 935). System 900 may correspond to a processor, such as a microprocessor, microcontroller, or other form of system-on-chip (SoC). System 900 may be implemented on a single integrated circuit or by use of multiple circuit elements coupled on a circuit board.

As illustrated, processing circuit 901 may be a processor core in a single or multiple core processor complex. System 900 may include a non-transitory computer-readable medium having instructions stored thereon that are executable by processing circuit 901 to perform the operations described below in regards to FIGS. 9-15. Such non-transitory computer-readable medium may include non-volatile memory circuits included in system memory circuit 910 and/or coupled thereto. The non-volatile memory circuits may include, for example, flash memory arrays, a solid-state drive, a hard disk drive, a universal serial bus (USB) drive, optical disk drives, floppy disk drives, and the like. System memory circuit 910 and cache memory circuit 905 may each respectively include one or more types of RAM, such as SRAM, DRAM, and the like.

Processing circuit 901, as shown, is configured to allocate storage locations 935 in system memory circuit 910 of system 900 to buffer 915. In various embodiments, processing circuit 901 and/or another agent in system 900 (not illustrated) may use buffer 915 to process information related to an application executing on system 900. To satisfy a desired performance of this application, access to buffer 915 may have particular quality-of-service (QoS) needs. To increase the probability of meeting the QoS needs, processing circuit 901 is further configured to allocate storage locations 935 into cache memory circuit 905. Accesses to cache memory circuit 905 may typically have a higher QoS level that accesses to system memory circuit 910.

To allocate buffer 915 to cache memory circuit 905, processing circuit 901 is configured to select a particular order for allocating storage locations 935 into cache memory circuit 905. This particular order may increase a uniformity of cache miss rates in comparison to a linear order. Allocating storage locations 935 in a linear order, e.g., starting with allocating location 935a and progressing, in order, with storage locations 935b, 935c, 935d, etc., through to storage location 935i may result in cache misses occurring more frequently for the storage locations at the end of buffer 915. For example, storage locations 935g, 935h, and 935i may have a higher probability of failing to be allocated due to a corresponding cache line already being allocated to a different storage location. Accordingly, a particular order for performing the allocations of storage locations 935 to cache memory circuit 905 is selected that allocates storage locations 935 in a more equitable fashion that increases a likelihood that locations at the end of buffer 915 may be successfully allocated to cache memory circuit 905.

After the particular order is selected, processing circuit 901 is further configured to cache ones of storage locations 935 of buffer 915 in cache memory circuit 905 in the particular order. In some embodiments, processing circuit 901 may be further configured to select and allocate subsets of storage locations 935, each with multiple storage locations, rather than selecting and allocating individual storage locations.

As an example, at time t0, processing circuit 901 allocates buffer 915, including storage locations 935, into system memory circuit 910. At time t1, processing circuit 901 is configured to segment, based on the particular order, buffer 915 into a plurality of blocks. This plurality of blocks corresponds to storage locations 935 and has a serial logical order as shown.

Each storage location 935 may include any suitable number of bytes of system memory circuit 910, such as one byte, sixteen bytes, 128 bytes, and so forth. In some embodiments, different storage locations 935 may include different numbers of bytes. For this example, one storage location 935 has a same number of bytes as one cache line 920. Sizes for storage locations 935 may be determined by processing circuit 901 based on the particular order. As shown, buffer 915 is divided into nine storage locations and the particular order includes allocating every third storage location, starting with storage location 935a, then 935d, and then 935g. The order wraps back to storage location 935b, then 935e, and then 935h. The final three storage locations are then allocated starting with 935c, then 935f, and ending with 935i.

Processing circuit 901 is further configured to cache storage locations 935 using an increment that selects ones of storage locations 935 in the particular order that is different than the serial order. In the illustrated example, this increment is three, although any suitable number may be used. Storage location 935a is allocated to cache line 920c, followed by storage location 935d to cache line 920f and then 935g allocated to cache line 920h. Cache memory circuit 905, as shown, is configured to map a given storage location 935 to a corresponding cache line 920 based on a particular system address included in the given storage location 935. For example, cache memory circuit 905 may perform a hash of the particular address, or a portion thereof, and the resulting hash value is used to map the particular address to a corresponding cache line 920. Since cache memory circuit 905 may be much smaller than system memory circuit 910, two different system addresses may result in hash values that map to the same cache line 920. In such a case, the second of the two addresses may fail to be allocated.

In the example of FIG. 9, storage locations 935b, 935f, and 935i are mapped to cache lines 920h, 920e, and 920c, respectively. These three cache lines 920, however, have already been allocated to storage locations 935a, 935h, and 935g, respectively. Accordingly, storage locations 935b, 935f, and 935i fail to be allocated. As shown by the italicized-bold text in buffer 915, the storage locations that failed to be allocated are spread throughout buffer 915. If contents of buffer 915 are then traversed by an agent in logical order starting at storage location 935a, cache misses occur one at a time, separated by two or more cache hits before reaching the next cache miss.

If, however, storage locations 935 had been allocated in the same linear order as buffer 915 is traversed, then storage location 935b would have been allocated rather than storage location 935g, and storage location 935f would have been allocated in place of storage location 935h. This would have resulted in storage locations 935g, 935h, and 935i all failing to allocate. When the agent traverses buffer 915 in this scenario, three cache misses occur in a row at the end of buffer 915, with no cache hits between the misses. Three fetches to system memory circuit 910 in a row could cause delays, as the second and third fetches may have to wait for the prior fetches to be processed. Accordingly, allocating buffer 915 using the particular order, rather than a linear order, may reduce an overall time for traversing through buffer 915.

After the allocation of buffer 915 to cache memory circuit 905 is complete, processing circuit 901, or other agents in system 900, may access cache memory circuit 905 as a low-latency path to values stored in buffer 915. Locations 935 that have been successfully cached may provide faster access to contents of buffer 915 as compared to accessing locations 935 in system memory circuit 910 directly.

It is noted that the embodiment of FIG. 9 is merely an example. FIG. 9 includes only elements for describing the disclosed techniques. In other embodiments, additional elements may be included. For example, one or more bus circuits, memory management units, and the like may be included in other embodiments. The number of cache lines and storage locations is limited for clarity. In other embodiments, any suitable number of cache lines and storage locations may be included.

In the description of FIG. 9, a failure to successfully allocate a location of a buffer is briefly discussed. If a particular location in the buffer is mapped to a cache line that has already been allocated to a different location in the buffer, then the allocation fails. In some embodiments, a particular location in a buffer may map to a cache line that is currently allocated to a different location in the system memory that is not associated with the buffer. A technique for handling such a case is now presented.

Moving now to FIG. 10, a block diagram of an embodiment of system 900 of FIG. 9 is again illustrated at two points in time. As shown, system 900 is the same as shown in FIG. 9, except that cache memory circuit is shown with four additional cache lines, cache lines 920i-920l. As stated above, cache memory circuit 905 is shown with a limited number of cache lines in FIG. 9 for clarity. In various embodiments, cache memory circuit 905 may include any suitable number of cache lines, including, for example, additional cache lines beyond the twelve shown in FIG. 10. Processing circuit 901 is shown allocating storage locations 935b, 935e, and 935h of buffer 915 into cache memory circuit 905. At time t0, processing circuit 901 attempts to allocate storage location 935b into cache line 920k.

As was shown in FIG. 9, storage location 935b was mapped to cache line 920h which had previously been allocated to storage location 935g of buffer 915. In the embodiment of FIG. 10, storage location 935b may be further mapped to cache line 920k. For example, cache memory circuit 905 may be set-associative and include a plurality of ways, such that a given system memory address may map to two or more cache lines 920. Accordingly, cache line 920k may be in a different way than cache line 920h and, therefore, may provide an alternative cache line in which to allocate storage location 935b.

Cache line 920k, at time t0 however, is allocated to storage location 1035y, which may be a location in system memory circuit 910 that is not associated with buffer 915. In response to the failure to cache storage location 935b to cache line 920k, processing circuit 901 is configured to retry the caching of storage location 935b before caching a different storage location. As shown, processing circuit 901 generates a new allocation request to cache storage location 935b. In some embodiments, processing circuit 901 may include a delay of a particular amount of time or number of instruction cycles or bus cycles between the original attempt to allocate storage location 935b and the retry attempt.

At time t1, storage location 1035y may be evicted from cache line 920k and, therefore, storage location 935b may be successfully cached into cache line 920k. Subsequently, processing circuit 901 may further attempt caching of storage location 935e, followed by storage location 935h.

By retrying the cache allocation attempt of storage location 935b, processing circuit 901 may increase a number of storage locations of buffer 915 that are successfully cached. The more storage locations of buffer 915 that can be allocated into cache memory circuit 905, the better the probability of meeting the QoS needs of the application that will utilize buffer 915.

It is noted that system 900 shown in FIG. 10 is an example for demonstrating the disclosed techniques. Only elements for describing these techniques are illustrated. As previously described, additional elements may be included in other embodiments, such as additional cache lines and storage locations, as well as additional processing circuits and other bus and memory management circuits.

The system of FIG. 9 describes a processing circuit as performing many of the actions associated with caching storage locations into a cache memory circuit. Various types of processing circuits may be utilized to perform such actions. One such processing circuit includes a direct-memory access (DMA) circuit, such as shown in FIG. 11.

Figure 11:
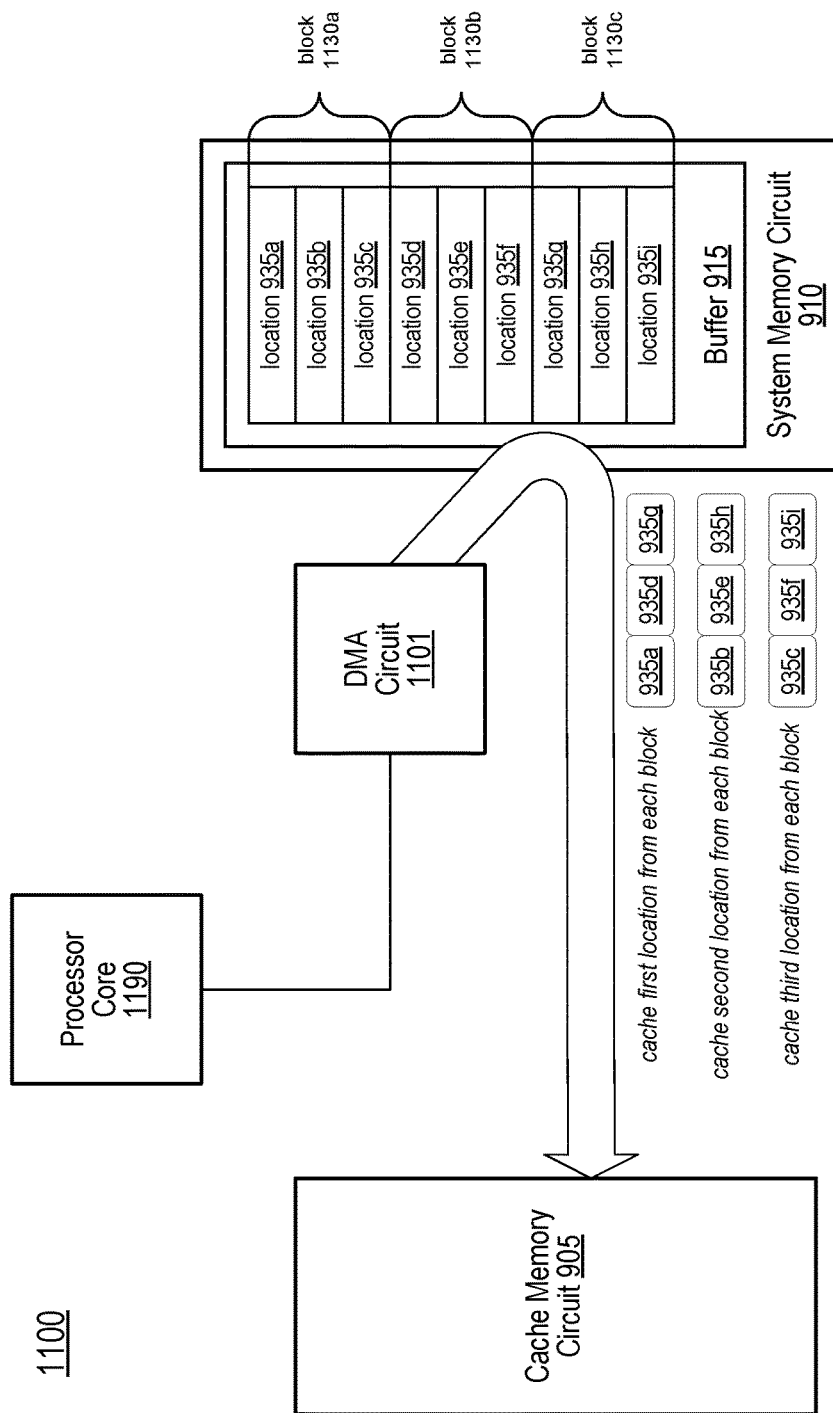
FIG. 11 depicts a block diagram of an embodiment of a system that includes a processor core and a DMA allocating a buffer to a cache memory.

Turning now to FIG. 11, an embodiment of a system that includes a DMA circuit for caching a buffer of a system memory in a cache memory is depicted. System 1100 includes processor core 1190 coupled to DMA circuit 1101, which is further coupled to cache memory circuit 905 and a system memory circuit 910. In various embodiments, DMA circuit 1101, processor core 1190, or a combination of the two may correspond to processing circuit 901 of FIGS. 9 and 10.

Processor core 1190 may be a general-purpose processor that performs computational operations. In some embodiments, processor core 1190 may be a special purpose processing core, such as a graphics processor, audio processor, or neural processor. Processor core 1190 may, in some embodiments, include a plurality of general and/or special purpose processor cores as well as supporting circuits for managing power signals, clock signals, memory requests, and the like. DMA circuit 1101, as depicted, is configured to issue memory transactions to copy or move values between various memory addresses across a memory map of system 1100. DMA circuit 1101 may be implemented as a specialized circuit, a general-purpose circuit programmed to perform such tasks, or a combination thereof. DMA circuit 1101 is programmable, at least by processor core 1190, to perform multiple memory transactions in a desired sequence.

As previously described, processing circuit 901 selects the particular order for caching storage locations of buffer 915 into cache memory circuit 905. As shown in system 1100, selecting the particular order is performed by processor core 1190, for example, based on a size of buffer 915, and/or an availability of cache lines in cache memory circuit 905. Processor core 1190 is configured to program the particular order into DMA circuit 1101, and to use DMA circuit 1101 to cache ones of storage locations 935 of buffer 915 in cache memory circuit 905. For example, DMA circuit 1101 may include various registers into which processor core 1190 may store source addresses for locations 935 and destination addresses for caching storage locations 935 into cache memory circuit 905, including providing the particular order for issuing memory transactions corresponding to ones of storage locations 935.

As illustrated, processor core 1190 is further configured to track a cache miss rate in cache memory circuit 905 for memory transactions that include accesses to storage locations 935. After buffer 915 has been allocated into cache memory circuit 905, processor core 1190, or a different agent in system 1100, may issue various memory transactions that access ones of storage locations 935. Depending on how many of storage locations 935 were successfully allocated to cache memory circuit 905, a particular cache miss rate may be determined for these memory transactions that target addresses in storage locations 935. For example, if ten percent of storage locations 935 fail to be allocated, and storage locations 935 are accessed equally by a particular agent using buffer 915, then the cache miss would be close or equal to ten percent. If, however, the particular agent accesses particular ones of storage locations 935 more frequently than others, then the cache miss rate may be higher or lower than ten percent depending on whether the more frequently accessed storage locations were successfully allocated.

In response to a determination that the tracked cache miss rate satisfies a threshold rate, processor core 1190 may be further configured to modify the particular order in DMA circuit 1101. For example, if the threshold miss rate is 15%, and the tracked miss rate is 18%, then processor core 1190 may identify storage locations 935 that were not cached, but were targeted frequently in memory transactions as well as identifying successfully cached storage locations 935 that were not targeted frequently. A revised order may adjust the order for allocating these identified storage locations such that the more frequently access locations are allocated sooner in the modified order and the less frequently accessed locations are moved towards the end of the modified order. When a subsequent buffer is to be allocated to cache memory circuit 905, the modified order may be selected over the original particular order. In some embodiments, various orders may be determined and associated with particular agents, tasks, processes, and the like, such that a selected order for allocation takes into consideration past performance of similar tasks.

In regards to determining an allocation order, a technique is disclosed in above in which subsequent storage locations are selected using a particular increment between successive locations. In FIG. 11, a technique is illustrated that includes dividing buffer 915 into a plurality of blocks 1130a-1130c (collectively blocks 1130) having respective series of contiguous storage locations 935. The nine illustrated storage locations 935 are divided into three blocks 1130, each block 1130 include three consecutive storage locations 935. Although blocks 1130 are shown to include an equal number of storage locations 935 per block, in other embodiments, the number of storage locations 935 included in each block 1130 may vary. For example, a use for buffer 915 may be known, and based on the known usage, particular storage locations 935, or groups of locations, may be known to be accessed infrequently, while others are known to be accessed more frequently. A number of storage locations 935 assigned to each block, therefore, may be adjusted such that, for example, an initial storage location 935 for each block is a location that is known to be accessed more frequently.

After storage locations 935 are divided into the respective blocks 1130, processor core 1190 may select a particular order that allocates a first storage location 935 of a respective series of ones of blocks 1130 to cache memory circuit 905, and then allocates a second storage location 935 of the ones of blocks 1130. As shown, block 1130a include initial storage location 935a, followed by storage locations 935c and 935c. Similarly, block 1130b includes initial storage location 935d, followed by storage locations 935e and 935f, while block 1130c includes initial storage location 935g, followed by storage locations 935h and 935i.

In a first pass, processor core 1190 causes DMA circuit 1101 to cache the initial storage location from each of blocks 1130, storage locations 935a, 935d, and 935g. DMA circuit 1101 subsequently, in a second pass, caches a second storage location from each block 1130 (storage locations 935b, 935e, and 935h), followed by a third pass in which a third location from each block 1130 (storage locations 935c, 935f, and 935i).

As stated above, processor core 1190 may modify the particular order based on a monitored cache miss rate. This modification may include adjusting a number of locations included in each block, a number of locations stored at a time from each block, or an order for allocating the locations within each block. For example, processor core 1190 may determine that storage location 935e is accessed more frequently than storage location 935d in block 1130b. In a modified order, the initial storage location allocated from block 1130b may be 935e rather than 935d.

It is noted that system 1100 is merely an example. FIG. 11 has been simplified for clarity. Although nine storage locations and three blocks are shown, buffer 915 may include any suitable number of storage locations and these locations may be divided into any suitable number of blocks. A number of locations included in each block may vary between blocks. In addition, a number of locations from each block that are allocated at a given time may vary between passes.

Various types of QoS levels are discussed in regards to FIGS. 1-8. Transactions that are used to cache a buffer from a system memory into a cache memory may also utilize different QoS levels for different tasks. FIG. 12 illustrates use of bulk and real-time transactions with the disclosed techniques.

Proceeding now to FIG. 12, an embodiment of system 900 from FIGS. 9 and 10 is shown at two different times, during a buffer allocation to cache and during use of the allocated buffer. System 900 includes the elements as previously shown in FIGS. 9 and 10. In addition, cache memory circuit 905 and system memory circuit 910 are configured to support bulk and real-time channels 1240 and 1245, respectively. In some embodiments, bulk and real-time channels 1240 and 1245 may utilize separate physical connections between various agents and memory circuits to complete the respective transactions. In other embodiments, at least a portion of the real-time channel 1245 and bulk channel 1240 are shared and may, and in some embodiments, be implemented as virtual bulk and real-time channels as described above.

At time t0, buffer 915 is cached into cache memory circuit 905. In the present embodiment, buffer 915 is a real-time buffer. A "real-time buffer" as used herein, refers to a memory buffer in which real-time transactions are predominantly used to access the locations of the buffer. A real-time buffer may be used with an agent and/or task in which failure to meet a particular QoS demand could result in improper operation of the agent or task. For example, process a frame of a video for playback needs to be completed within a particular amount of time, otherwise the video playback may produce a noticeable stall or glitch to the viewer.

Although buffer 915 is a real-time buffer, the initial allocation of buffer 915 into cache may not be time sensitive. Accordingly, caching storage locations 935 of buffer 915 may be performed using bulk transactions 1242 across bulk channel 1240 to allocate the plurality of storage locations 935 into cache memory circuit 905. As shown at time t0, bulk channel 1240 is used to transfer bulk transactions 1242a, 1242b, and 1242c to allocate storage locations 935a, 935d and 935g, respectively, in cache memory circuit 905. During this buffer allocation task, the agent to be using buffer 915, processing circuit 901, for example, may not have values ready to read from or write to buffer 915. Accordingly, the bulk transactions 1242 may be used for allocating buffer 915.

Since, however, buffer 915 is expected to be used with real-time transactions, bulk transactions 1242 may include an indication with successfully cached storage locations 935 indicating that these cached storage locations are associated with real-time transactions. For example, cache tags associated with each successfully cache storage location 935 may have a particular bit or group of bits set that indicate that the associated cache line 920 will be used with real-time transactions. Cache lines 920 with the real-time indications in their respective cache tags, may receive a higher priority when cache lines are identified for eviction. For example, if a particular number of cache lines 920 in cache memory circuit 905 reaches threshold level, e.g., approaching a certain percentage of maximum storage capacity, then particular ones of cache lines 920 that have not been accessed frequently may be selected for eviction. Cache lines 920 with the real-time indications set may be omitted from consideration for eviction or may be placed very low in an order for being selected, e.g., other cache lines would have higher likelihoods of being selected for eviction.

Cache memory circuit 905 may also reserve a particular amount of bandwidth for fetching data from system memory circuit 910 in response to a cache miss associated with a real-time memory transaction. Cache memory circuit 905 may limit a number of bulk transactions that are issued and active at a given point in time such that bandwidth remains to issue a real-time transaction. For example, bus circuits between cache memory circuit 905 and system memory circuit 910 may include a credit-based arbiter circuit. In order to have an issued transaction selected by this arbiter circuit, cache memory circuit 905 may need to maintain a particular number of bus credits. In such an embodiment, cache memory circuit 905 may delay issuing a bulk transaction if the number of bus credits is at or near the particular number. The bulk transaction may be sent after cache memory circuit 905 has accumulated a sufficient number of bus credits.

At time t1, buffer 915 has been allocated to cache memory circuit 905. As indicated by the bold, italicized text, locations 935$f$ and 935$i$ failed to be successfully cached. For example, storage locations 935$f$ and 935$i$ may have been mapped to cache lines 920$i$ and 920$l$, which were previously allocated to storage locations 1235$x$ and 1235$y$, respectively. Processing circuit 901 is further configured to access the successfully cached storage location 935$c$ using real-time transaction 1250$a$. Cache memory circuit 905 may be configured to process real-time transaction 1250$a$ using values stored in cache line 920$a$.

Cache memory circuit 905 is configured to generate fetch requests to system memory circuit 910 in response to a cache miss associated with a respective memory transaction, the generated fetch requests having a QoS level compatible with the corresponding memory transaction. For example, cache memory circuit 905 may generate bulk fetches 1265$a$ and 1265$b$ in response to bulk transactions from a given agent. Processing circuit 901 may be further configured to access the unsuccessfully cached storage location 935$f$ using real-time transaction 1250$b$. Cache memory circuit 905, in response to a cache miss for storage location 935$f$, is configured to fulfill real-time transaction 1250$b$ using real-time fetch 1290. Since cache memory circuit 905 is configured to reserve bandwidth for real-time fetches, real-time fetch may be processed ahead of other bulk fetches that have not been issued. For example, bulk fetch 1265$b$ may be queued waiting for a completion of bulk fetch 1265$a$. If real-time fetch 1290 is generated before bulk fetch 1265$b$ issues, then real-time fetch 1290 may be processed ahead of bulk fetch 1265$b$.

Use of such real-time and bulk QoS levels may reduce access times for an agent using a real-time buffer allocated to cache memory. Use of the real-time QoS level may also reduce memory access times in the event of a portion of the real-time buffer fails to be allocated to the buffer.

It is noted that the embodiment of FIG. 12 is an example used for demonstrative purposes. For clarity, a number elements depicted in FIG. 12 has been minimized. Despite the number of storage locations and cache lines illustrated, any suitable number of storage locations and cache lines may be included in other embodiments. Although only real-time and bulk transactions are shown, any suitable number of QoS levels may be used in other embodiments.

The circuits, processes, and techniques described above in regards to FIGS. 9-12 describe various techniques for allocating a buffer that is in a system memory to a cache memory. A variety of methods may be used to implement these various techniques. Three such methods are described below in reference to FIGS. 13-15.

Moving now to FIG. 13, a flow diagram for an embodiment of a method for caching a buffer that is in a system memory into a cache memory circuit is shown. In various embodiments, method 1300 may be performed by processing circuit 901 in FIGS. 9, 10, and 12, as a part of process for caching buffer 915 in cache memory circuit 905. For example, processing circuit 901 may include (or have access to) a non-transitory, computer-readable medium having program instructions stored thereon that are executable by the processing circuit to cause the operations described with reference to FIG. 13. Referring collectively to FIGS. 9 and 13, method 1300 begins in block 1310.

At block 1310, method 1300 includes allocating, by processing circuit 901, a plurality of storage locations 935 in system memory circuit 910 to buffer 915. As shown, processing circuit 901, or a different agent in system 900, may request buffer 915 be allocated in system memory circuit 910 for use with a particular process or task that the agent is preparing to perform. For example, the task may involve processing of an image, an audio file, encryption or decryption of a file, analysis of input from a sensor, and the like. In some embodiments, buffer 915 may be a real-time buffer that uses real-time transactions to access storage locations 935. As previously described, real-time transactions have a higher QoS level than other transactions, such as bulk transactions.

Method 1300 further includes, at block 1320, determining a particular order for allocating storage locations 935 into cache memory circuit 905. This particular order may be selected to increase a uniformity of cache miss rates in comparison to use of a linear order. As previously described, allocating storage locations 935 using a linear order may result in storage locations 935 near the beginning of the linear order being successfully cached while storage locations 935 at the end of the linear order fail to be successfully cached due to being mapped to the same cache lines 920 as previously cached storage locations 935. If data in buffer 915 is accessed from storage locations 935 in a same order as they were allocated, then more cache misses would be expected as processing moves towards the end of the order. Accordingly, the particular order is selected such that caching occurs in an order that attempts to evenly distribute cache misses during use of buffer 915. Accordingly, during use of buffer 915, cache misses may not be concentrated during any particular portion of buffer accesses.

At block 1330, method 1300 also includes caching storage locations 935 of buffer 915 using the particular order. After the particular order for allocating storage locations 935 has been selected, processing circuit 901 begins allocating ones of storage locations 935 into cache memory circuit 905. In some embodiments, such as shown in FIG. 10, method 130 may include retrying, in response to a failure to cache a particular storage location 935 (e.g., storage location

935*b*), the caching of storage location 935*b* before caching a different storage location 935, such as storage location 935*e*.

Method 1300 may end in block 1330. In some embodiments, at least a portion of method 1300 may be repeated. For example, method 1300 may be repeated in response to receiving a request for allocating a different buffer in system memory circuit 910. In some cases, method 1300 may be performed concurrently with other instances of the method. For example, two or more instances of processing circuit 901, or multiple process threads in a single instance of processing circuit 901, may each perform method 1300 independently from one another.

Figure 14:
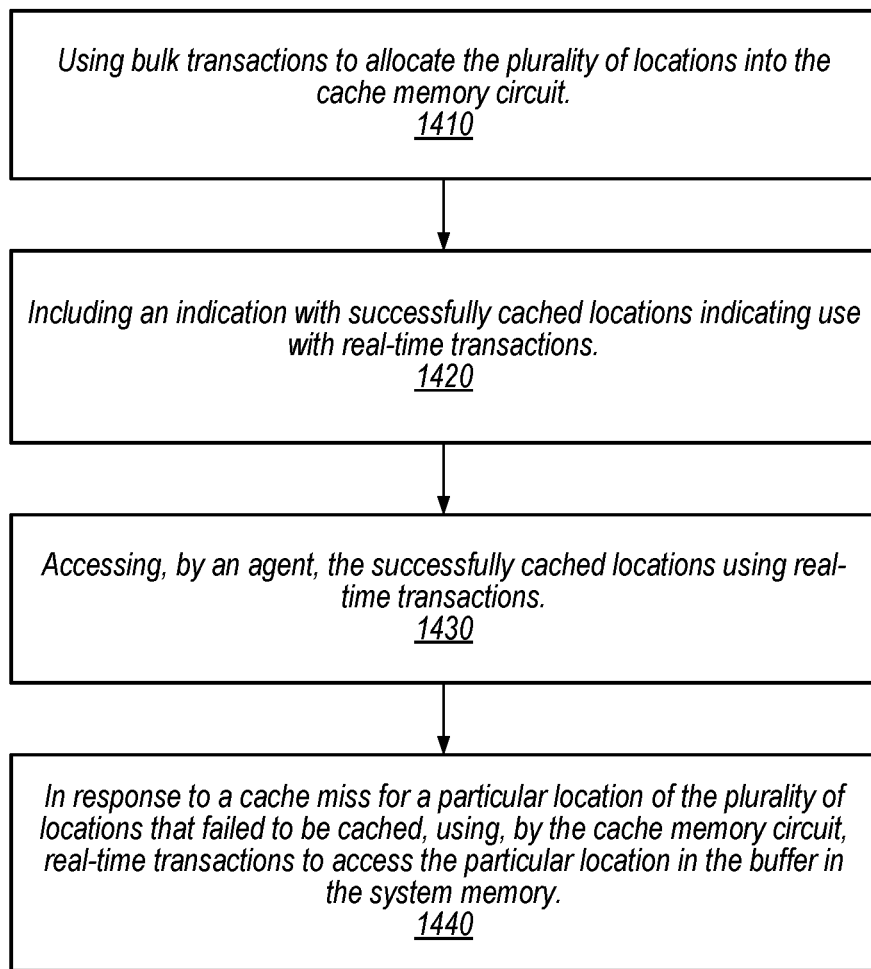
FIG. 14 depicts a flow diagram of an embodiment of a method for using bulk transactions and real-time transactions in conjunction with a buffer and a cache memory.

Turning now to FIG. 14, a flow diagram for an embodiment of a method for using various QoS levels with a buffer that is allocated into a cache memory circuit is illustrated. In a similar manner as method 1300, method 1400 may be performed by processing circuit 901 in FIGS. 9, 10, and 12. As described above, processing circuit 901 may include (or have access to) a non-transitory, computer-readable medium having program instructions stored thereon that are executable by processing circuit 901 to cause the operations described with reference to FIG. 14. Referring collectively to FIGS. 12 and 14, method 1400 begins in block 1410.

At block 1410, method 1400 includes using bulk transactions to allocate the plurality of locations into the cache memory circuit. As illustrated, the allocation process of buffer 915 may not have a critical QoS demand. Accordingly, caching of storage locations 935 of buffer 915 may be performed using bulk transactions 1242 to allocate storage locations 935 into cache memory circuit 905. As shown at time t0 of FIG. 12, bulk channel 1240 is used to transfer bulk transactions 1242*a*, 1242*b*, and 1242*c* to allocate storage locations 935*a*, 935*d* and 935*g*, respectively, into cache memory circuit 905.

Method 1400 also includes, at block 1420, including an indication with successfully cached storage locations 935 indicating use with real-time transactions. Although the allocation process for buffer 915 may not have had a real-time demand, buffer 915 may be expected to be accesses using real-time transactions. Accordingly, when a particular storage location 935 is successfully cached into a respective cache line 920, a corresponding cache tag for the cache line may include an indication that the cached contents are associated with real-time transactions. As previously described, such indications may help avoid eviction of cache lines 920 that have been allocated to buffer 915.

At block 1430, method 1400 further includes accessing, by an agent (e.g., processing circuit 901), the successfully cached storage locations 935 using real-time transactions. After the allocation of buffer 915 has been completed, processing circuit 901, as shown in FIG. 12, may access ones of storage locations 935 using real-time transactions 1250*a* and 1250*b*. Real-time transaction 1250*a* hits cache line 920*a* where storage location 935*c* has been cached. If real-time transaction 1250*a* includes a read request, data from cache line 920*a*, corresponding to a requested address, may be sent from cache memory circuit 905 to processing circuit 901 using a real-time transaction.

Method 1400 at block 1440 also includes, in response to a cache miss for a particular location of storage locations 935 that failed to be cached, using, by cache memory circuit 905, real-time transactions to access the particular storage location 935 in buffer 915 in system memory circuit 910. As shown in FIG. 12, real-time transaction 1250*b* is targeted to storage location 935*f*. Storage location 935*f*, however, failed to be successfully cached in cache memory circuit 905.

Accordingly, cache memory circuit 905 generates and issues real-time fetch 1290 to system memory circuit 910 to retrieve values from storage location 935*f*. If either of bulk fetches 1265*a* and 1265*b*, also generated by cache memory circuit 905, have not been issued when real-time fetch 1290 is ready to be issued, then real-time fetch 1290 may be prioritized ahead of the unissued bulk fetches.

Method 1400 may end in block 1440, or in some embodiments, may be repeated, in whole or in part. For example, block 1430 may be repeated while processing circuit 901 is processing values in buffer 915. Similarly, block 1440 may be repeated when processing circuit 901 accesses a storage location 935 that was not successfully cached. In a similar manner as method 1300, method 1400 may be performed concurrently with other instances of method 1400.

Proceeding now to FIG. 15, a flow diagram for an embodiment of a method for selecting and adjusting a particular order for allocating a buffer to a cache memory circuit is illustrated. As described for methods 1300 and 1400, method 1400 may be performed by processing circuit 901 in FIGS. 9, 10, and 12. As described, processing circuit 901 may include (or have access to) a non-transitory, computer-readable medium having program instructions stored thereon that are executable by processing circuit 901 to cause the operations described with reference to FIG. 15. Referring collectively to FIGS. 12 and 15, method 1500 begins in block 1510.

At block 1510, method 1500 includes determining the particular order using a desired cache miss rate for the plurality of storage locations 935. As described above, the particular order for allocating buffer 915 may be selected with a goal of distributing cache misses across buffer 915. An agent that will use buffer 915 (e.g., processing circuit 901) may process data that is stored in buffer 915 using a linear order. Processing circuit 901 may start at an initial storage location such as 935*a*, and proceed through storage locations 935 in sequence, e.g., 935*b*, 935*c*, and so forth, ending with storage location 935*i*. If storage locations 935 are allocated in this same linear order, then more storage locations 935 may fail to be cached towards the end of buffer 915. Processing data in buffer 915 in the same order may result in an increasing cache miss rate as processing progresses, potentially peaking towards the end of buffer 915. The particular order may be selected to distribute failures of storage locations 935 to be allocated across buffer 915, such that as buffer 915 is processed, a peak cache miss rate remains below the desired cache miss rate.

Method 1500, at block 1520, also includes accessing, by processing circuit 901 after the caching, the plurality of storage locations 935 using a linear order. As described, processing circuit 901 may access buffer 915 using a linear order, different from the particular order. In other embodiments, processing circuit 901 may use a different order that a linear order. In such embodiments, the particular order may be selected to be different that the different order, including, for example, using a linear order to allocate storage locations 935.

At block 1530, the method further includes tracking a cache miss rate associated with the use of the particular order to cache the plurality of storage locations 935. As processing circuit 901 uses buffer 915, an observed cache miss rate may be tracked, and may further be compared to the desired cache miss rate. If the particular order for allocating storage locations 935 was effective, then the tracked cache miss rate should remain below the desired cache miss rate as the cache misses may occur more consistently throughout the processing of all data in buffer 915.

By distributing the cache misses consistently, a peak cache miss rate should remain reasonably low, and not exceed the desired cache miss rate.

Method 1500 further includes, at block 1540, in response to determining that the tracked cache miss rate satisfies a threshold rate, adjusting the particular order for a subsequent use. As illustrated, if the tracked cache miss rate reaches or exceeds the desired cache miss rate, then allocating buffer 915 using the selected particular order did not achieve the desired results. The threshold rate may be equal to the desired cache miss rate, or may be adjusted higher or lower based on overall system operating goals. To adjust the particular order, cache misses that occurred at the time the cache miss rate satisfied the threshold rate may be analyzed to identify storage locations 935 that were being accessed. One or more of these identified storage locations 935 may be selected to be moved closer to the beginning of an adjusted allocation order. In addition, storage locations 935 that were accessed at a time when the cache miss rate was low may also be identified. One or more of these storage locations may be selected to be moved towards the end of the adjusted allocation order.

Method 1500 may end in block 1540, or may be repeated, in whole or in part, in some embodiments. For example, blocks 1520 and 1530 may be repeated while processing circuit 901 is accessing the storage locations 935 in buffer 915. As described for methods 1300 and 1400, method 1500 may also be performed concurrently with other instances of method 1500. In addition, methods 1300, 1400, and 1500 may be performed concurrently with each other.

Figure 16:
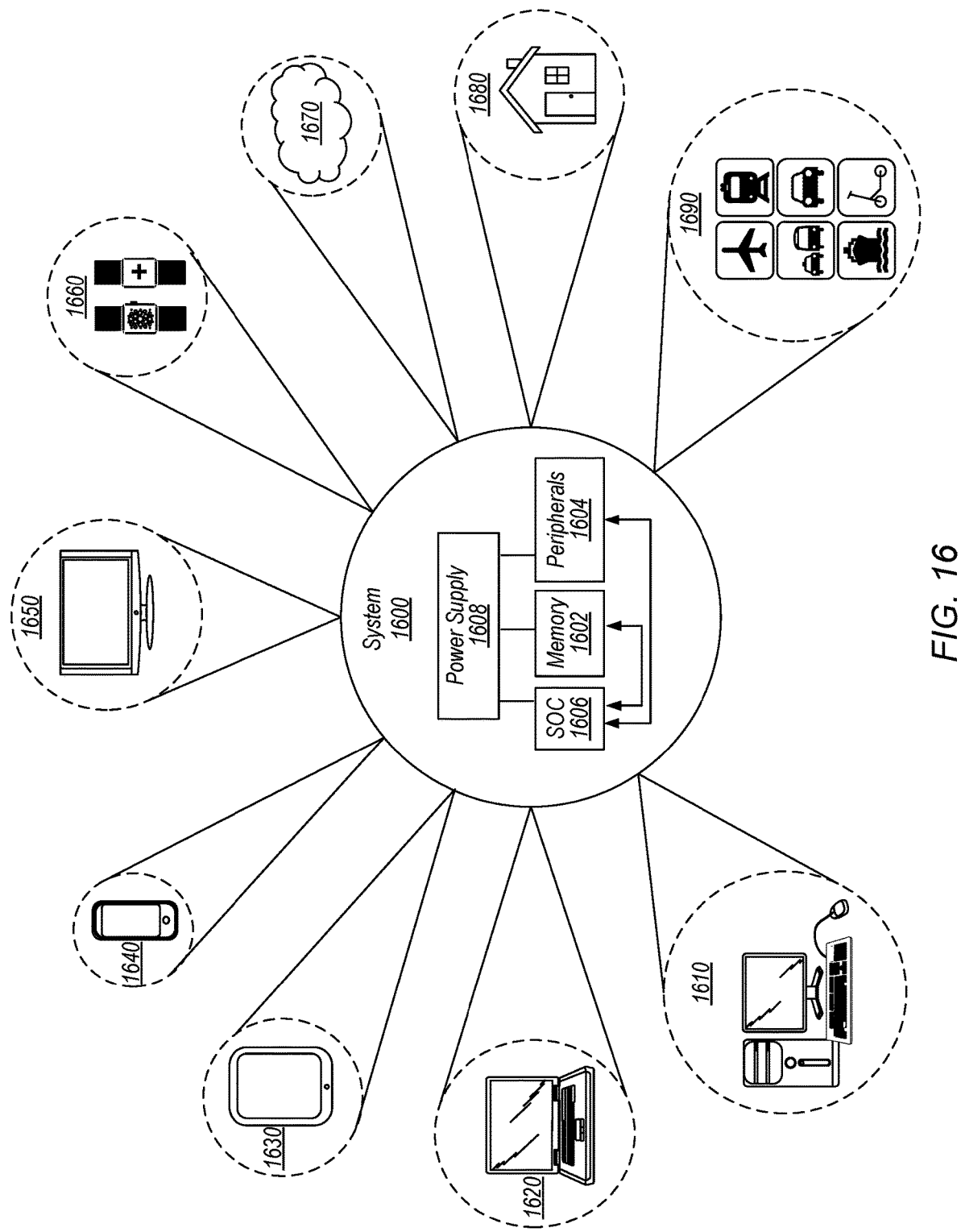
FIG. 16 shows various embodiments of systems that include coupled integrated circuits.

FIGS. 1-8 illustrate circuits and methods for a system that reallocates a portion of a cache memory for use as a directly-addressable address region. FIGS. 9-15 depict circuits and techniques for caching a buffer that is in a system memory into a cache memory circuit. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 1600 is illustrated in FIG. 16. Computer system 1600 may, in some embodiments, include any of the disclosed embodiments such as systems 100, 200, 500, 600, 900, or 1100.

In the illustrated embodiment, the system 1600 includes at least one instance of a system on chip (SoC) 1606 which may include multiple types of processing circuits, such as a central processing unit (CPU), a graphics processing unit (GPU), or otherwise, a communication fabric, and interfaces to memories and input/output devices. In some embodiments, one or more processors in SoC 1606 includes multiple execution lanes and an instruction issue queue. In various embodiments, SoC 1606 is coupled to external memory 1602, peripherals 1604, and power supply 1608.

A power supply 1608 is also provided which supplies the supply voltages to SoC 1606 as well as one or more supply voltages to the memory 1602 and/or the peripherals 1604. In various embodiments, power supply 1608 represents a battery (e.g., a rechargeable battery in a smart phone, laptop or tablet computer, or other device). In some embodiments, more than one instance of SoC 1606 is included (and more than one external memory 1602 is included as well).

The memory 1602 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1604 include any desired circuitry, depending on the type of system 1600. For example, in one embodiment, peripherals 1604 includes devices for various types of wireless communication, such as Wi-Fi, Bluetooth, cellular, global positioning system, etc. In some embodiments, the peripherals 1604 also include additional storage, including RAM storage, solid state storage, or disk storage. The peripherals 1604 include user interface devices such as a display screen, including touch display screens or multi-touch display screens, keyboard or other input devices, microphones, speakers, etc.

As illustrated, system 1600 is shown to have application in a wide range of areas. For example, system 1600 may be utilized as part of the chips, circuitry, components, etc., of a desktop computer 1610, laptop computer 1620, tablet computer 1630, cellular or mobile phone 1640, or television 1650 (or set-top box coupled to a television). Also illustrated is a smartwatch and health monitoring device 1660. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices 1660 are contemplated as well, such as devices worn around the neck, devices attached to hats or other headgear, devices that are implantable in the human body, eyeglasses designed to provide an augmented and/or virtual reality experience, and so on.

System 1600 may further be used as part of a cloud-based service(s) 1670. For example, the previously mentioned devices, and/or other devices, may access computing resources in the cloud (i.e., remotely located hardware and/or software resources). Still further, system 1600 may be utilized in one or more devices of a home 1680 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 16 is the application of system 1600 to various modes of transportation 1690. For example, system 1600 may be used in the control and/or entertainment systems of aircraft, trains, buses, cars for hire, private automobiles, waterborne vessels from private boats to cruise liners, scooters (for rent or owned), and so on. In various cases, system 1600 may be used to provide automated guidance (e.g., self-driving vehicles), general systems control, and otherwise.

It is noted that the wide variety of potential applications for system 1600 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 16 are illustrative only and are not intended to be limiting. Other devices are possible and are contemplated.

As disclosed in regards to FIG. 16, computer system 1600 may include one or more integrated circuits included within a personal computer, smart phone, tablet computer, or other type of computing device. A process for designing and producing an integrated circuit using design information is presented below in FIG. 17.

Figure 17:
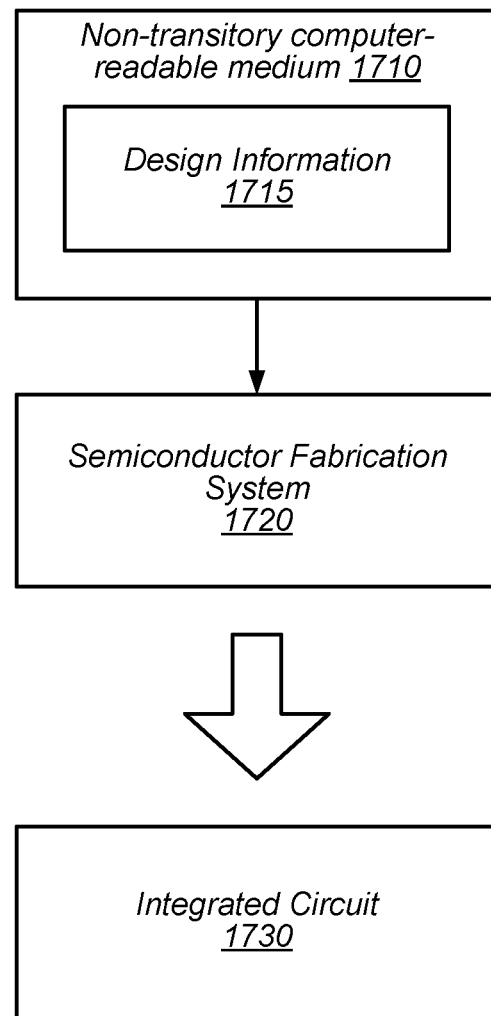
FIG. 17 depicts a block diagram of an example computer-readable medium, according to some embodiments.

FIG. 17 is a block diagram illustrating an example of a non-transitory computer-readable storage medium that stores circuit design information, according to some embodiments. The embodiment of FIG. 17 may be utilized in a process to design and manufacture integrated circuits, for example, any of systems 100, 200, 500, 600, 900, or 1100 as shown and described throughout FIGS. 1-15. In the illustrated embodiment, semiconductor fabrication system 1720 is configured to process the design information 1715 stored on non-transitory computer-readable storage medium 1710 and fabricate integrated circuit 1730 (e.g., system 100) based on the design information 1715.

Non-transitory computer-readable storage medium 1710, may comprise any of various appropriate types of memory devices or storage devices. Non-transitory computer-readable storage medium 1710 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1710 may include other types of non-transitory memory as well or combinations thereof. Non-transitory computer-readable storage medium 1710 may include two or more memory mediums which may reside in different locations, e.g., in different computer systems that are connected over a network.

Design information 1715 may be specified using any of various appropriate computer languages, including hardware description languages such as, without limitation: VHDL, Verilog, SystemC, SystemVerilog, RHDL, M, MyHDL, etc. Design information 1715 may be usable by semiconductor fabrication system 1720 to fabricate at least a portion of integrated circuit 1730. The format of design information 1715 may be recognized by at least one semiconductor fabrication system, such as semiconductor fabrication system 1720, for example. In some embodiments, design information 1715 may include a netlist that specifies elements of a cell library, as well as their connectivity. One or more cell libraries used during logic synthesis of circuits included in integrated circuit 1730 may also be included in design information 1715. Such cell libraries may include information indicative of device or transistor level netlists, mask design data, characterization data, and the like, of cells included in the cell library.

Integrated circuit 1730 may, in various embodiments, include one or more custom macrocells, such as memories, analog or mixed-signal circuits, and the like. In such cases, design information 1715 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1720 may also be configured to perform various testing of fabricated circuits for correct operation.

In various embodiments, integrated circuit 1730 is configured to operate according to a circuit design specified by design information 1715, which may include performing any of the functionality described herein. For example, integrated circuit 1730 may include any of various elements shown or described herein. Further, integrated circuit 1730 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to"

perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a cache memory circuit including cache memory having a plurality of cache lines; and
a cache controller circuit configured to:
receive a request to reallocate a portion of the cache memory circuit that is currently in use, wherein the request identifies an address region corresponding to one or more of the plurality of cache lines; and
in response to the request:
set, for at least one of the one or more cache lines, a respective real-time memory indicator, wherein a given real-time memory indicator denotes that a corresponding cache line is associated with real-time transactions that have higher priorities than bulk transactions; and
convert, based on the real-time memory indicators, the one or more cache lines to directly-addressable, random-access memory (RAM) by excluding the one or more cache lines from cache operations.

2. The apparatus of claim 1, wherein the cache controller circuit is further configured to:
support a real-time virtual channel for memory transactions in the identified address region; and
prioritize a memory transaction received via the real-time virtual channel over a memory transaction received via a bulk virtual channel.

3. The apparatus of claim 1, wherein the cache controller circuit is further configured to:
determine that the address region is included in a secure-access region; and
in response to the determination, ignore a memory transaction in the address region from an agent that is unauthorized to access the secure-access region.

4. The apparatus of claim 1, wherein the cache controller circuit is further configured to flush the one or more cache lines before converting the one or more cache lines to the directly-addressable RAM.

5. The apparatus of claim 1, wherein the cache controller circuit is further configured to:
in response to data in a valid cache line being written, issue a write-back request for the valid cache line; and
exclude the one or more cache lines from write-back requests.

6. The apparatus of claim 1, wherein the cache controller circuit is further configured to:
receive a different request to deallocate the portion of the cache memory from the directly-addressable RAM; and
in response to the different request, include the one or more cache lines in cache operations without copying data stored in the directly-addressable RAM while the one or more cache lines were reallocated.

7. The apparatus of claim 6, wherein the cache controller circuit is further configured, in response to a memory transaction in the directly-addressable RAM received after deallocating the portion of the cache memory, to generate an error.

8. A method, comprising:
receiving, by a cache controller circuit, a request to reallocate a portion of a cache memory circuit, that is currently in use, to a directly-addressable address region, wherein the request identifies an inactive address region;
based on the identified address region, selecting one or more cache lines of the cache memory circuit to convert; and
setting, by the cache controller circuit, a respective indication for ones of the selected cache lines to exclude the selected cache lines from further cache operations, wherein the respective indication includes a real-time memory indicator denoting that the associated selected cache line is associated with real-time transactions that have higher priorities than bulk transactions.

9. The method of claim 8, further comprising mapping, based on the real-time memory indicators, the selected cache lines for use in the identified address region.

10. The method of claim 8, further comprising, in response to determining that the identified address region is part of a secure access region, ignoring, by the cache controller circuit, a memory transaction for the identified address region from an agent that is unauthorized to access the secure access region.

11. The method of claim 8, further comprising flushing, by the cache controller circuit, the selected cache lines prior to setting the respective indications.

12. The method of claim 8, wherein data written to a particular address that is currently cached in the cache memory circuit is written-back to the particular address in a system memory; and
wherein data written to a different address that is in the identified address region is not written-back to the system memory.

13. The method of claim 8, further comprising:
receiving, by the cache controller circuit, a different request to deallocate the portion of the cache memory circuit from the directly-addressable address region; and
in response to the different request, including the selected cache lines in cache operations, wherein data stored in the directly-addressable address region while the selected cache lines were reallocated is overwritten without a write-back to a system memory circuit.

14. The method of claim 13, is further comprising returning, by the cache controller circuit, a default value in response to a read request for an address in the directly-addressable address region received after deallocating the portion of the cache memory circuit.

15. A system, comprising:
a cache memory circuit including cache memory having a plurality of ways;
a processor configured to issue memory requests using an address map that includes active and inactive address regions; and
a cache controller circuit configured to:
receive a request from the processor to reallocate a portion of the cache memory as directly-addressable memory, wherein the request identifies an inactive address region;
based on the request, select a portion of the ways to convert by setting one or more respective real-time memory indicators for a selected way, and wherein a given real-time memory indicator denotes that the corresponding way is associated with real-time transactions that have higher priorities than bulk transactions; and
map, based on the real-time memory indicators, the selected portion of ways for use in the identified address region.

16. The system of claim 15, wherein to convert the selected portion of ways, the cache controller circuit is configured to set the respective real-time indicators in cache tags corresponding to particular cache lines included in the selected portion of ways, wherein the respective real-time indicators cause the particular cache lines to be removed from use as cache memory.

17. The system of claim 16, further comprising a system memory mapped to at least a portion of the active address regions, and wherein the inactive address regions are not mapped to the system memory.

18. The system of claim 15, wherein the cache controller circuit is further configured, in response to receiving a request to deallocate the directly-addressable memory, to include the selected portion of ways in cache operations, wherein data stored in the directly-addressable memory while the selected portion of ways were reallocated is not relocated in response to the request to deallocate the directly-addressable memory.

19. The system of claim 15, wherein the cache controller circuit is further configured to flush cache lines in the selected portion of ways prior to mapping the selected portion of ways for use in the identified address region.

20. The system of claim 15, wherein the portion of the ways is one-half of a particular way.

* * * * *